(12) United States Patent
Natsume et al.

(10) Patent No.: US 9,623,908 B2
(45) Date of Patent: Apr. 18, 2017

(54) LOWER VEHICLE-BODY STRUCTURE OF VEHICLE

(71) Applicant: MAZDA MOTOR CORPORATION, Hiroshima (JP)

(72) Inventors: Hirotaka Natsume, Hiroshima (JP); Kenji Maruyama, Hiroshima (JP); Masanobu Hanazaki, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 14/966,193

(22) Filed: Dec. 11, 2015

(65) Prior Publication Data
US 2016/0207568 A1 Jul. 21, 2016

(30) Foreign Application Priority Data

Jan. 21, 2015 (JP) .................................. 2015-009297

(51) Int. Cl.
*B62D 21/06* (2006.01)
*B62D 25/20* (2006.01)

(52) U.S. Cl.
CPC ......... *B62D 21/06* (2013.01); *B62D 25/2036* (2013.01)

(58) Field of Classification Search
CPC ............................ B62D 21/06; B62D 25/2036
USPC ................................................... 296/193.07
See application file for complete search history.

(56) References Cited

U.S. PATENT DOCUMENTS

| 8,052,205 B2* | 11/2011 | Matsuyama | B62D 25/20 296/193.07 |
| 8,226,156 B2* | 7/2012 | Shiono | B60N 2/4235 296/193.02 |
| 9,238,485 B2* | 1/2016 | Atsumi | B62D 25/20 |
| 2005/0061498 A1* | 3/2005 | Tohda | B60H 1/246 165/204 |
| 2006/0055207 A1* | 3/2006 | Reinhardt | B62D 25/20 296/193.07 |
| 2010/0244489 A1* | 9/2010 | Shiono | B60N 2/4235 296/193.01 |

FOREIGN PATENT DOCUMENTS

| JP | 2008-184125 A | 8/2008 |
| JP | 2008-230435 A | 10/2008 |

* cited by examiner

*Primary Examiner* — Pinel Romain
(74) *Attorney, Agent, or Firm* — Studebaker & Brackett PC

(57) ABSTRACT

A tunnel side frame includes a U-shaped portion having a U-shaped cross section opening upward, the U-shaped portion comprising a bottom face portion, an outer face portion, and an inner face portion. A front tunnel member comprises a first face portion which faces to the bottom face portion of the tunnel side frame, a second face portion which faces to the inner face portion of the tunnel side frame, and a third face portion which extends inward from an upper end of the second face portion. The front tunnel member is attached to a vehicle body by attaching the first face portion to the bottom face portion of the U-shaped portion and attaching the third face portion to a floor tunnel.

5 Claims, 17 Drawing Sheets

FIG. 12A
FIG. 12B
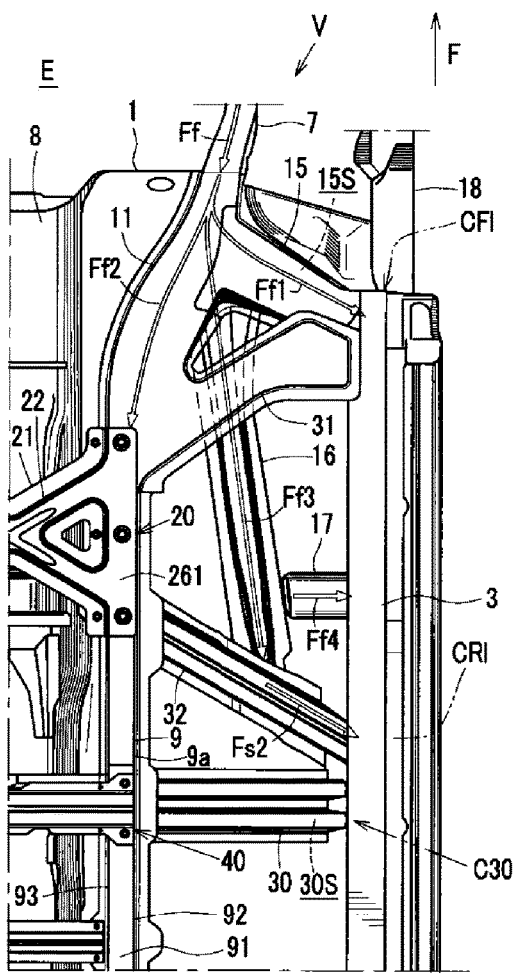
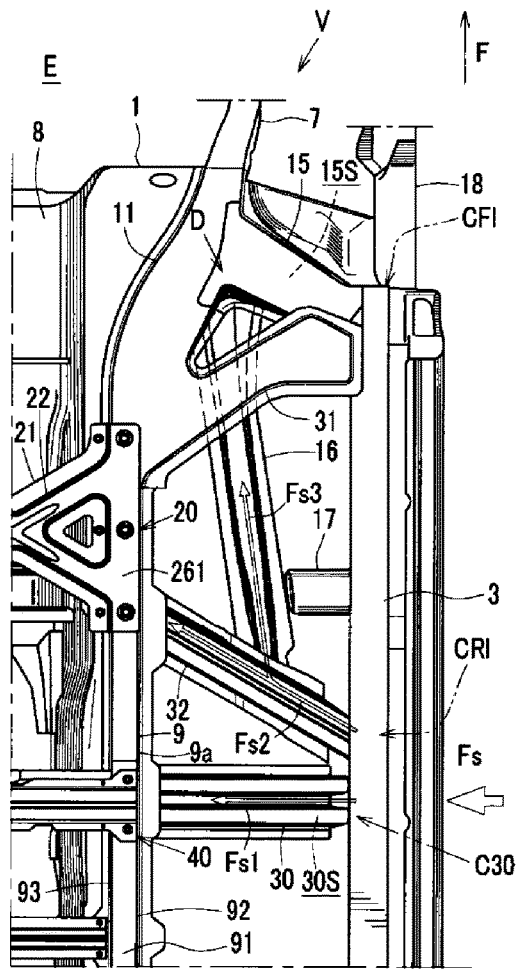

LOWER VEHICLE-BODY STRUCTURE OF VEHICLE

BACKGROUND OF THE INVENTION

The present invention relates to a lower vehicle-body structure of a vehicle, comprising right-and-left side sills extending in a vehicle longitudinal direction at both outward sides, in a vehicle width direction, of a vehicle body, a floor panel connected to the right-and-left side sills, a floor tunnel protruding upward at a central portion of the floor panel, a pair of tunnel side frames extending in the vehicle longitudinal direction along both sides, in the vehicle width direction, of the floor tunnel, and a tunnel member connecting right-and-left lower portions of the floor tunnel.

A conventional lower vehicle-body structure of a vehicle which is disclosed in Japanese Patent Laid-Open Publication Nos. 2008-230435 or 2008-184125, for example, has been proposed in order to achieve the smooth load transmission at a lower portion of a floor tunnel when a collision load is inputted.

The above-described first patent document discloses a floor structure of an automotive vehicle in which there is provided a first panel which interconnects both sides, in a vehicle width direction, of a lower portion of a center tunnel, extending over the center tunnel, and this first panel is joined to lower faces of floor under reinforcements which are arranged at the both sides, in the vehicle width direction, of the lower portion of the center tunnel with bolts.

Further, the first patent document discloses the structure comprising a second panel which is joined to an upper face of the first panel such that its end portions are configured to face to inside wall faces of the floor under reinforcements. According to this structure, when a load is inputted in a vehicle side collision, the end portions of the second panel contact and support the floor under reinforcement, so that deformation of the floor under reinforcement can be prevented properly, which is described in this patent document as an effect.

In the floor structure of the automotive vehicle of the above-described first patent document, however, the end portions of the second panel and the inside wall faces of the floor under reinforcements facing to the second panel's end portions are not directly fixed to each other.

Moreover, the second panel is merely joined to the floor under reinforcements indirectly via the first panel which is joined to the lower face of the floor under reinforcements only with the bolts.

Therefore, there is a concern in the floor structure of the automotive vehicle of the first patent document that their facing face portions slide improperly when receiving a large load, such as a collision load. Thus, there is room for improvement in order to achieve the smoother load transmission at the lower portion of the floor tunnel (center tunnel).

The above-described second patent document discloses a vehicle-body floor portion structure which comprises a pipe member which penetrates a floor tunnel portion and connects right-and-left floor portions and a pair of upper-and-lower brackets which join the pipe members such that an end portion, in an axial direction, of the pipe member is interposed between these brackets.

Further, according to the second patent document, the upper bracket of the pair of upper-and-lower brackets is provided with load input faces which are arranged to face to inward-side side walls of tunnel side members (tunnel side member inner wall faces) which are arranged both sides, in the vehicle width direction, of the floor tunnel portion such that when a load is inputted, the load is inputted from the tunnel side member inner wall faces to the upper bracket.

Further, the lower bracket of the pair of upper-and-lower brackets is provided a fixation portion which is configured to contact the lower faces of the tunnel side members and be fixedly fastened to the tunnel side members with bolts and nuts.

In the vehicle-body floor portion structure of the above-described second patent document, however, the above-described fixation portion is provided at another face different from the load-input face, and the load-input face and the tunnel side member inner wall face are not fixed directly despite their receiving the large collision load. Moreover, the lower bracket is configured to be fixedly fastened such that the fixation portion contacts the lower face of the tunnel side member at a single point only.

Therefore, there is a concern in the vehicle-body floor portion structure of the second patent document similarly to the floor structure of the automotive vehicle of the first patent document that the facing face portions slide improperly when receiving the large load, such as the collision load, so that there is room for improvement in order to achieve the smoother load transmission at the lower portion of the floor tunnel (floor tunnel portion).

SUMMARY OF THE INVENTION

Accordingly, an object of the present invention is to properly achieve the smoother load transmission at the lower portion of the floor tunnel by preventing the facing face portions of the tunnel member and the tunnel side frames from sliding improperly when the collision load is inputted.

The present invention is a lower vehicle-body structure of a vehicle, comprising right-and-left side sills extending in a vehicle longitudinal direction at both outward sides, in a vehicle width direction, of a vehicle body, a floor panel connected to the right-and-left side sills, a floor tunnel protruding upward at a central portion of the floor panel, a pair of tunnel side frames extending in the vehicle longitudinal direction along both sides, in the vehicle width direction, of the floor tunnel, and a tunnel member connecting right-and-left lower portions of the floor tunnel, wherein the tunnel side frame includes a U-shaped portion having a U-shaped cross section which opens upward, the U-shaped portion comprising a bottom face portion, an outer face portion, and an inner face portion, the tunnel member comprises a first face portion which faces to the bottom face portion of the tunnel side frame, a second face portion which faces to the inner face portion of the tunnel side frame, and a third face portion which extends inward from an upper end of the second face portion, and the tunnel member is attached to the vehicle body by attaching the first face portion to the bottom face portion of the tunnel side frame and attaching the third face portion to the floor tunnel directly or via a bracket, respectively.

According to the present invention, the facing face portions of the tunnel member and the tunnel side frame can properly contact each other without improper sliding when the collision load is inputted, so that the smooth load transmission at the lower portion of the floor tunnel can be achieved.

Another aspect of the present invention is a lower vehicle-body structure of a vehicle, comprising right-and-left side sills extending in a vehicle longitudinal direction at both outward sides, in a vehicle width direction, of a vehicle body, a floor panel connected to the right-and-left side sills, a floor tunnel protruding upward at a central portion of the floor panel, a pair of tunnel side frames extending in the vehicle longitudinal direction along both sides, in the vehicle width direction, of the floor tunnel, and a tunnel member connecting right-and-left lower portions of the floor tunnel, wherein the tunnel side frame includes a U-shaped portion having a U-shaped cross section which opens upward, the U-shaped portion comprising a bottom face portion, an outer face portion, and an inner face portion, the tunnel member comprises a first face portion which faces to the bottom face portion of the tunnel side frame, a second face portion which faces to the inner face portion of the tunnel side frame, and a third face portion which extends inward from an upper end of the second face portion, and the tunnel member is attached to the vehicle body by attaching the second face portion to the inner face portion of the tunnel side frame directly or via a bracket.

According to the above-described aspect of the present invention, the facing face portions of the tunnel member and the tunnel side frame can properly contact each other without improper sliding when the collision load is inputted, so that the smooth load transmission at the lower portion of the floor tunnel can be achieved.

In an embodiment of the present invention, the tunnel member is attached to the vehicle body by attaching the first face portion to the bottom face portion of the tunnel side frame directly or via a bracket.

According to this embodiment, the effect of the above-described aspect of the present invention, specifically, the above-described effect that the load transmission at the lower portion of the floor tunnel can be improved can be enhanced.

In another embodiment of the present invention, two portions of the attaching are provided substantially at the same position in the vehicle longitudinal direction.

According to this embodiment, the above-described effect that the load transmission at the lower portion of the floor tunnel can be improved can be enhanced.

Other features, aspects, and advantages of the present invention will become apparent from the following description which refers to the accompanying drawings.

BRIEF DESCRIPTION OF THE DRAWINGS

FIGS. 12A and 12B are views showing an operation of the present lower vehicle-body structure of the vehicle in a vehicle frontal collision and a vehicle side collision.

DETAILED DESCRIPTION OF THE INVENTION

Figure 1:
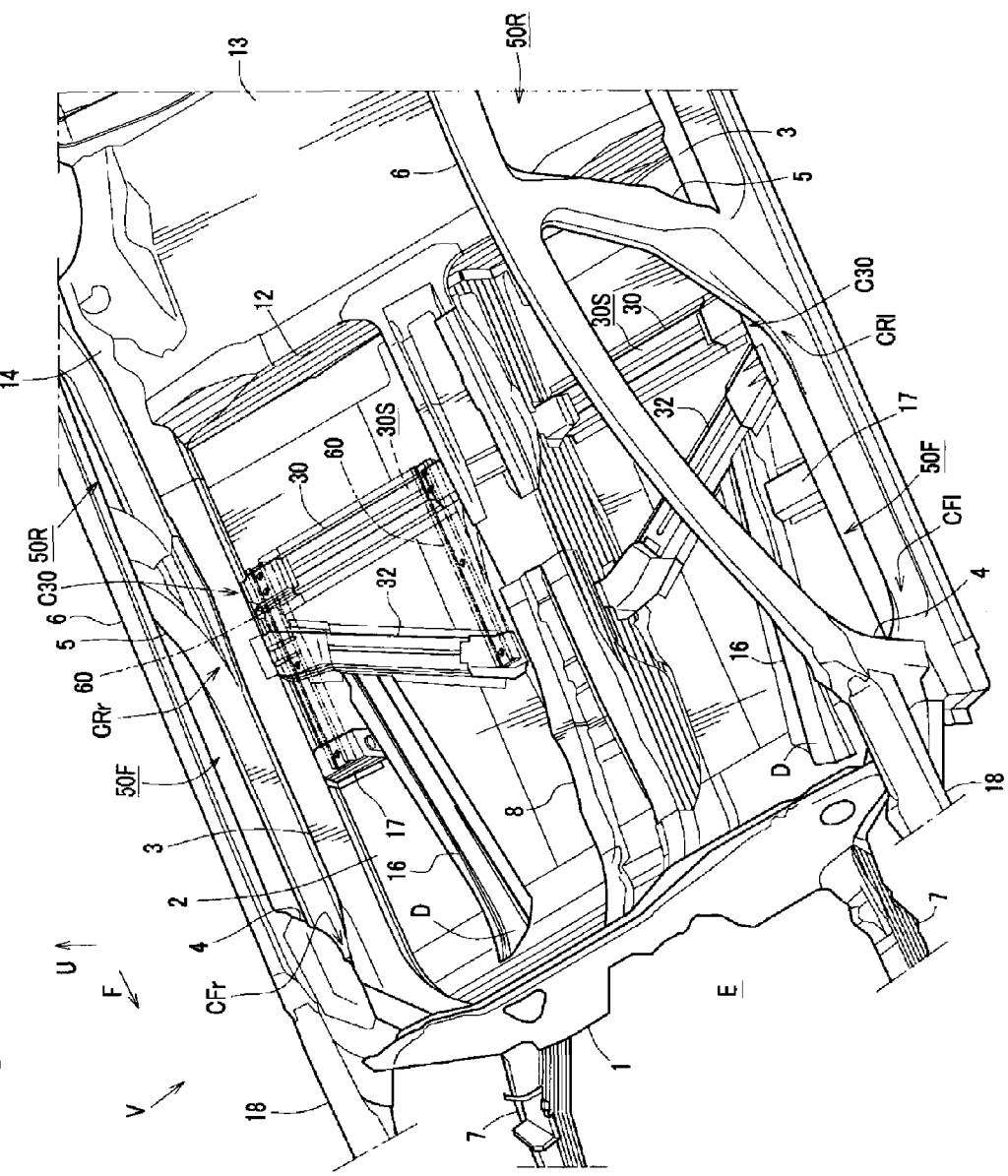
FIG. 1 is a perspective view of a lower vehicle-body structure of a vehicle according to an embodiment of the present invention, when viewed from obliquely above.

An example of the present invention will be described referring to the drawings. In the drawings, an arrow F shows a font side of a vehicle body, an arrow U shows an upper side of the vehicle body, an arrow IN shows an inward side of the vehicle body, and an arrow OUT shows an outward side of the vehicle body.

The drawings show a lower vehicle-body structure of a vehicle V of the present embodiment. FIG. 1 is a perspective view of the present lower vehicle-body structure of the vehicle, when viewed from obliquely above, FIG. 2 is a bottom view of the present lower vehicle-body structure of the vehicle, FIG. 3 is a bottom view of the present lower vehicle-body structure of the vehicle, FIG. 4 is a sectional view taken along line A-A of FIG. 3, and FIG. 5 is a sectional view of the present lower vehicle-body structure of the vehicle taken along a horizontal plane at a specified level.

Figure 5:
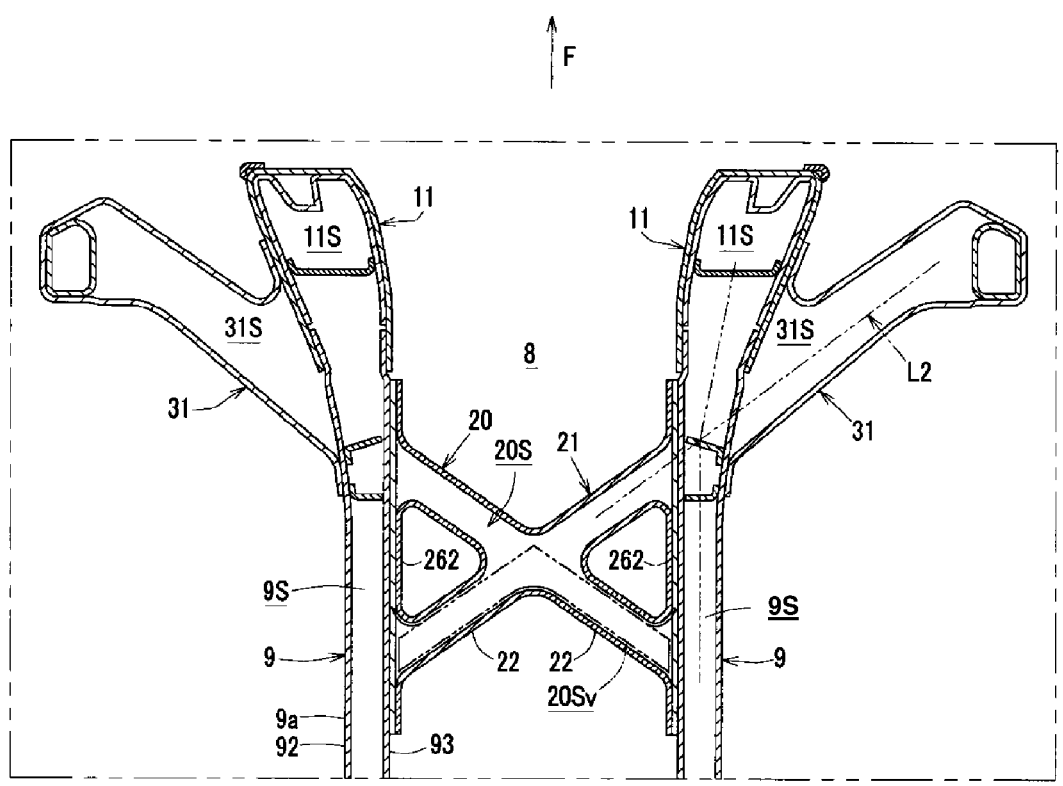
FIG. 5 is a sectional view of the present lower vehicle-body structure of the vehicle taken along a horizontal plane at a specified level.
Figure 6:
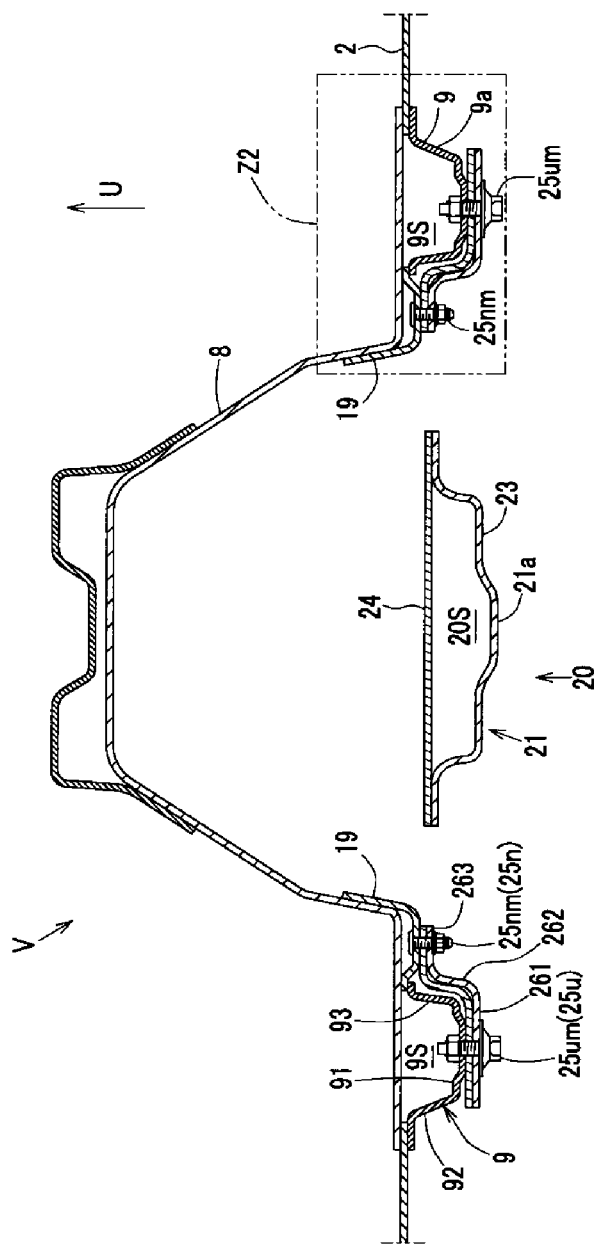
FIG. 6 is a sectional view taken along line B-B of FIG. 3.
Figure 7A:
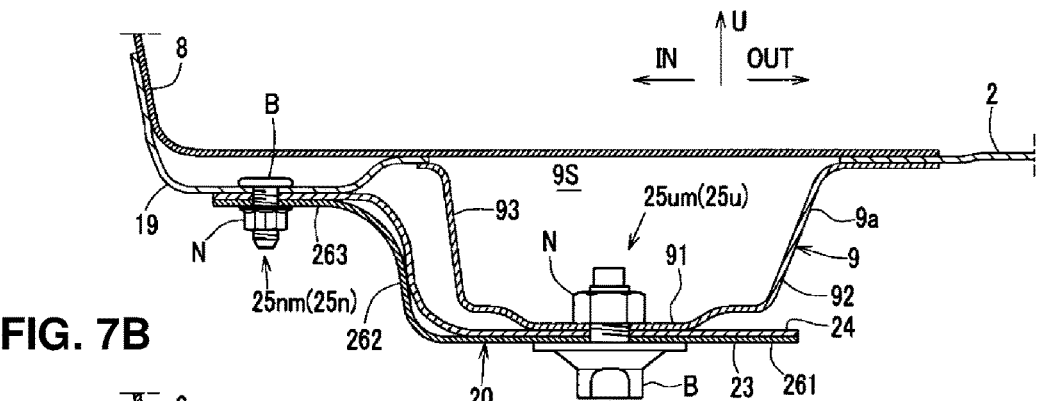
FIGS. 7A, 7B and 7C are explanatory views of an attachment structure of a front tunnel member to a vehicle body according to the present embodiment and modifications.
Figure 7B:
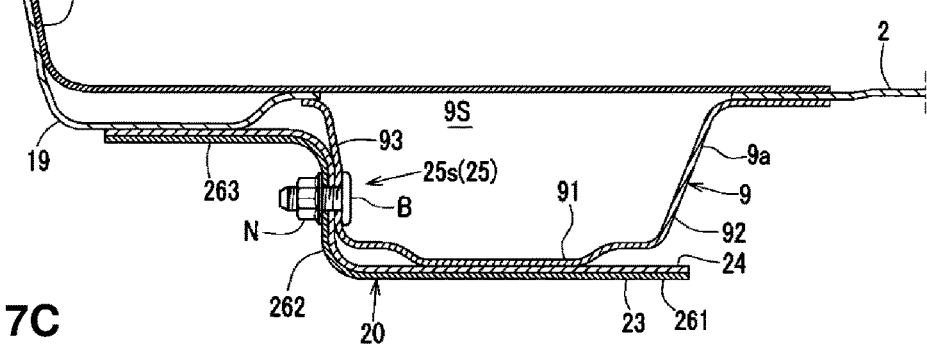
Figure 7C:
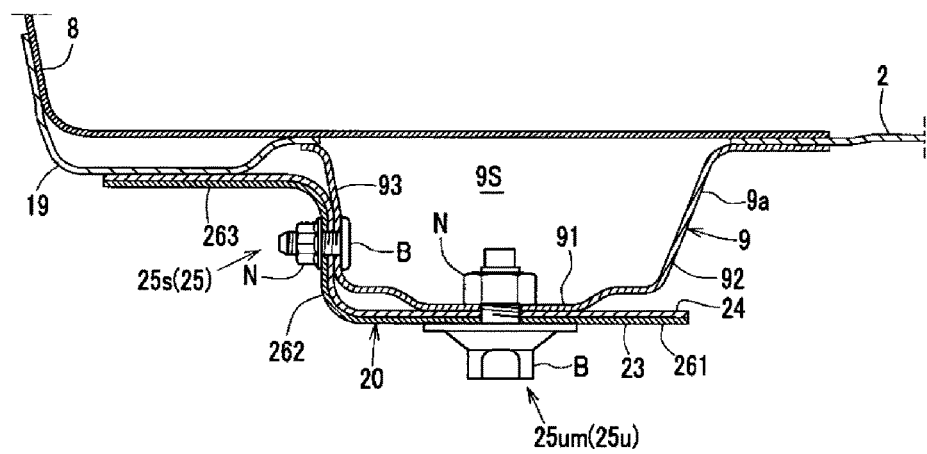
Figure 8:
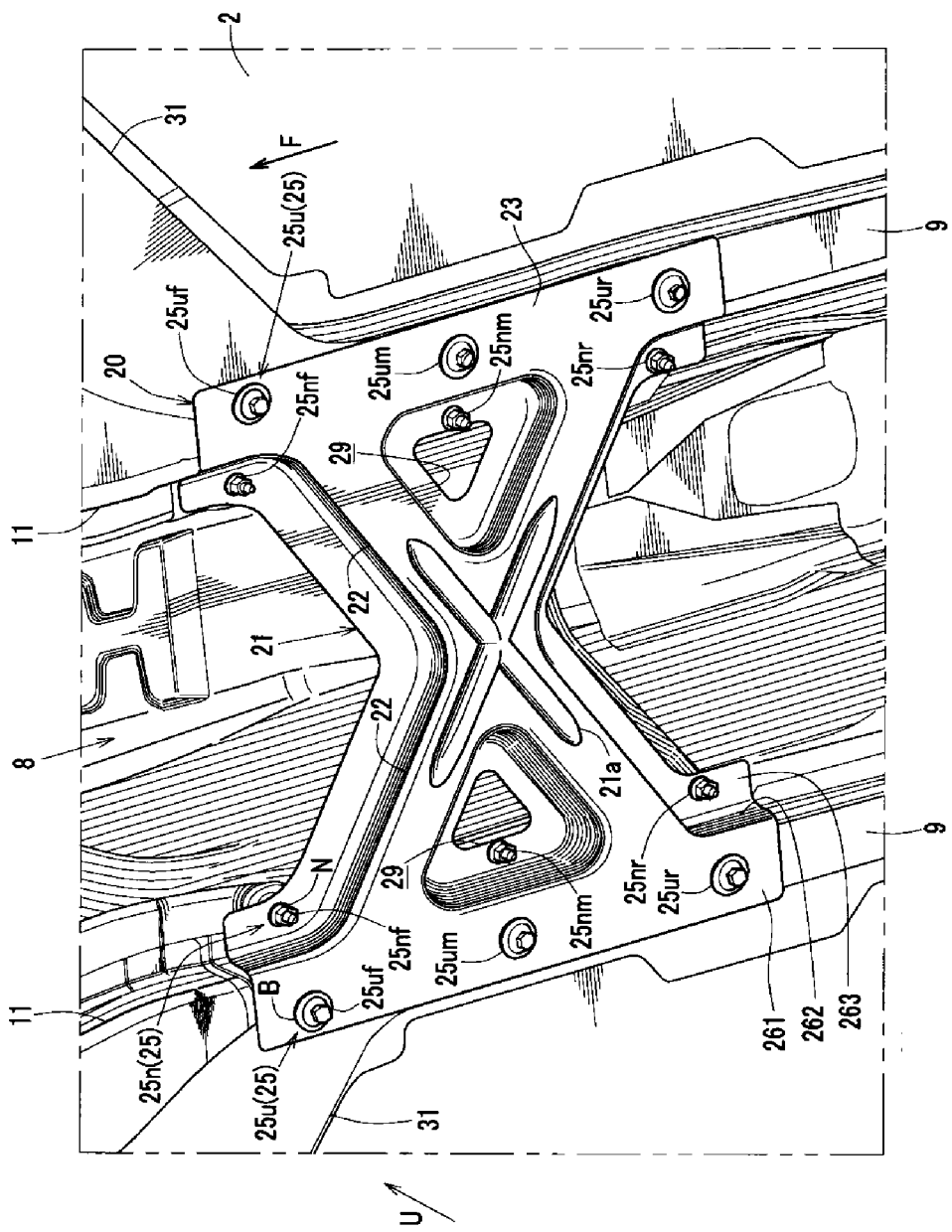
FIG. 8 is a perspective view of the front tunnel member, when viewed from obliquely below.
Figure 9A:
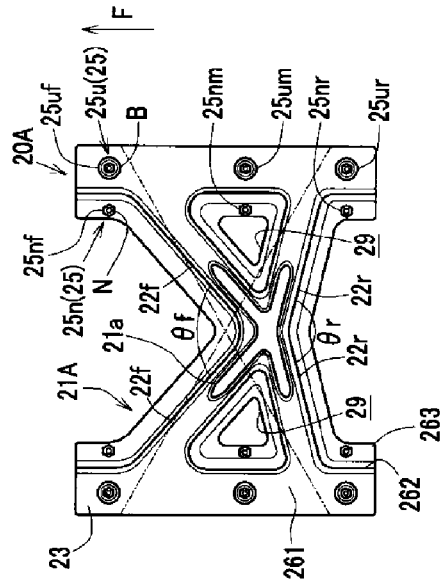
FIGS. 9A, 9B, 9C and 9D are bottom views of the front tunnel member according to the present embodiment and modifications.
Figure 9B:
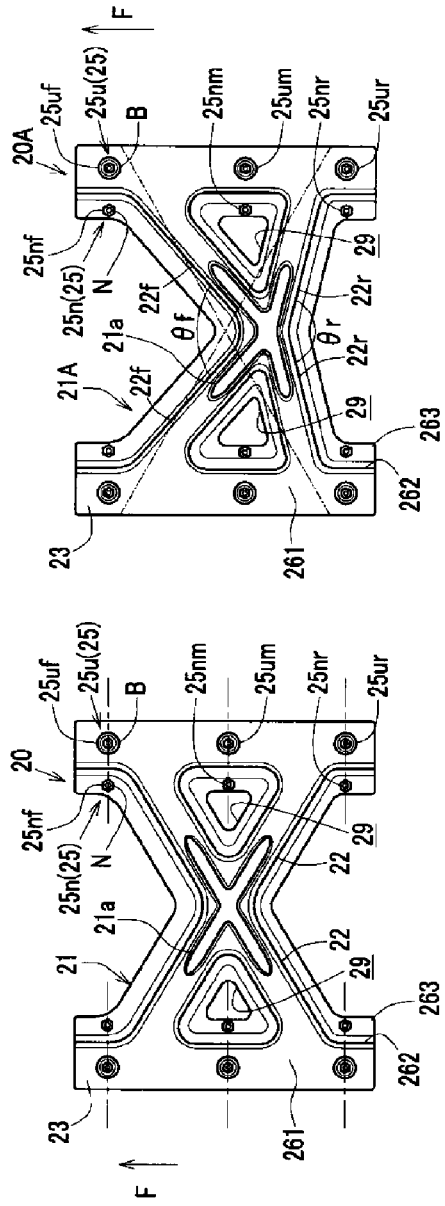
Figure 9C:
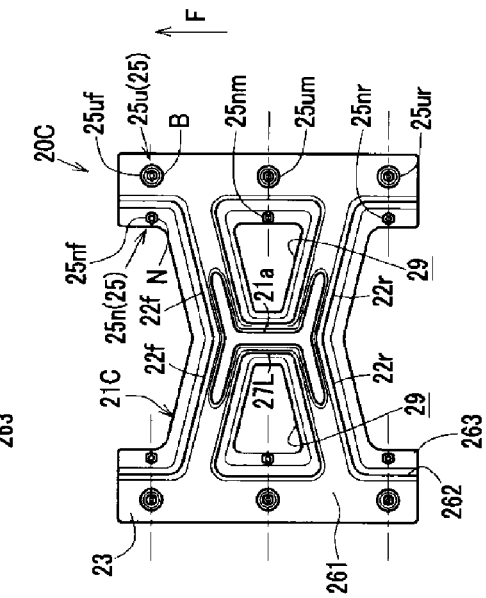
Figure 9D:
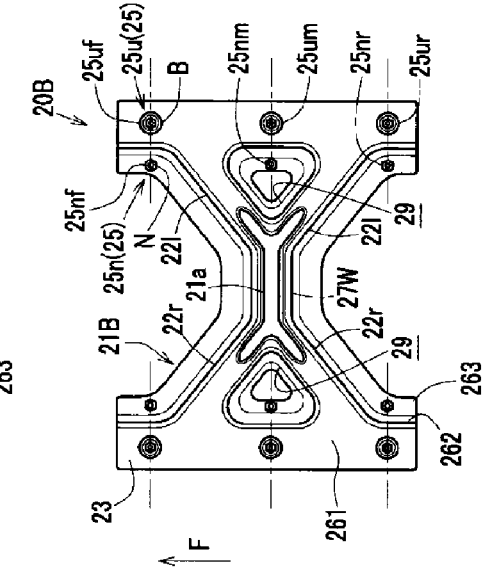
Figure 10A:
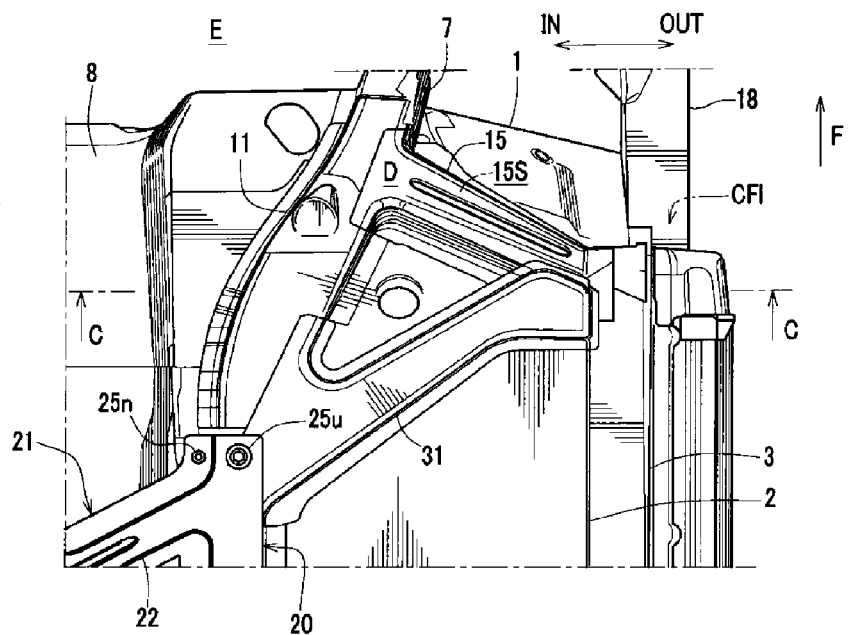
FIGS. 10A and 10B are explanatory views showing a vertical relationship between a torque box and an inclination member.
Figure 10B:
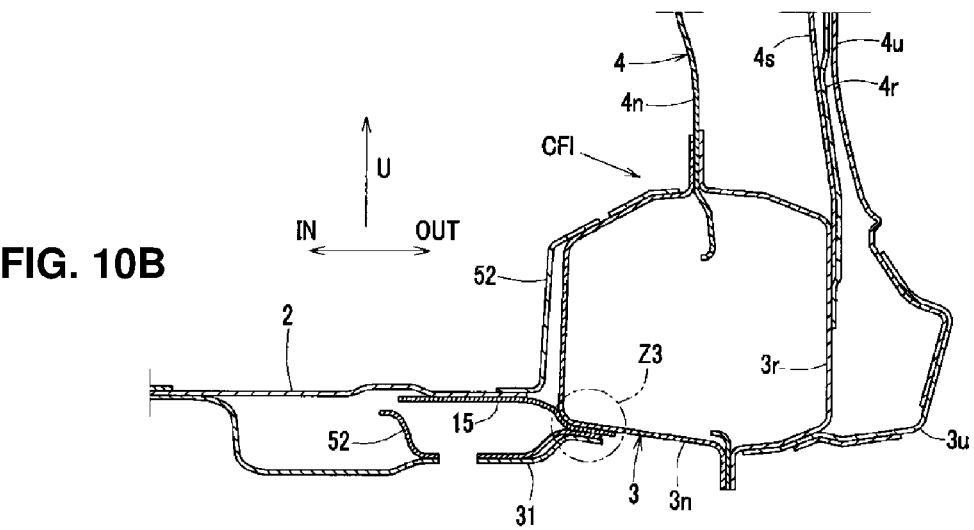
Figure 11:
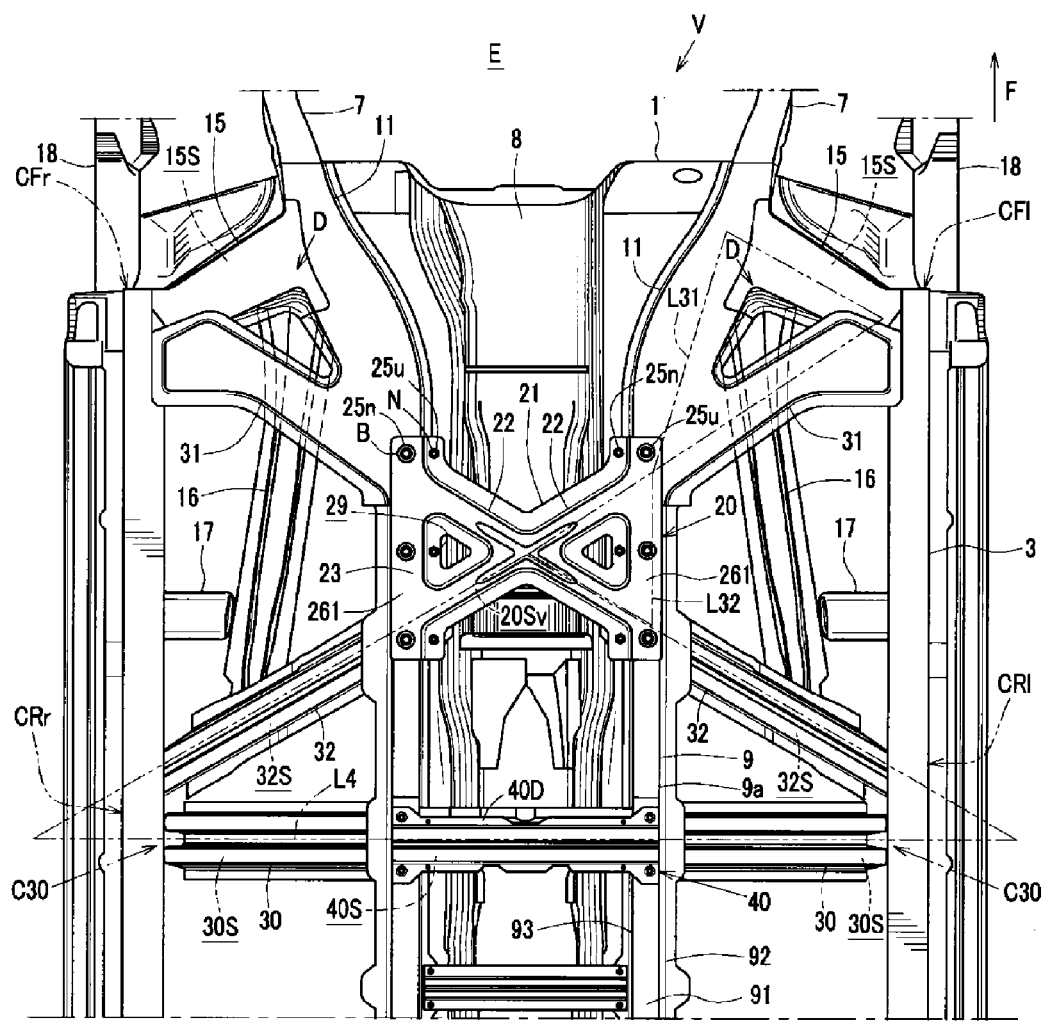
FIG. 11 is an explanatory view showing an arrangement of respective members in the present lower vehicle-body structure of the vehicle.
Figure 13A:
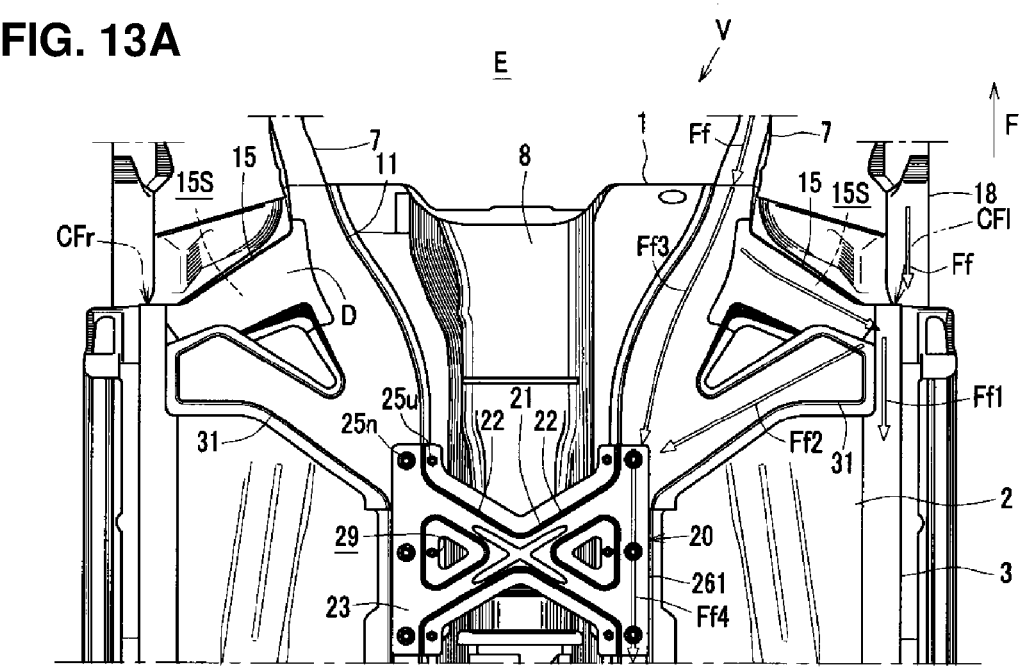
FIGS. 13A and 13B are views showing another operation of the present lower vehicle-body structure of the vehicle in the vehicle frontal collision.
Figure 13B:
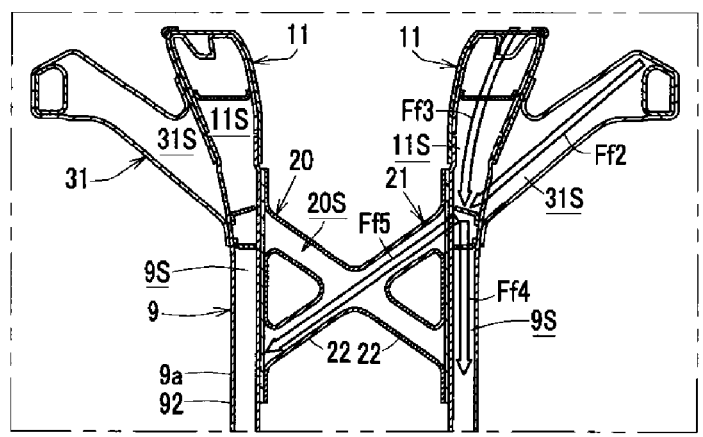

FIG. 6 is a sectional view taken along line B-B of FIG. 3, and FIGS. 7A, 7B and 7C are explanatory views of an attachment structure of a front tunnel member to a vehicle body of the present embodiment and modifications. Specifically, FIG. 7A is an enlarged view of an area Z2 of FIG. 6, FIG. 7B is an explanatory view of a modification, which corresponds to FIG. 7A, and FIG. 7C is an explanatory view of further another modification, which corresponds to FIG. 7A. FIG. 8 is a perspective view of the front tunnel member, when viewed from obliquely below, and FIG. 9A is a bottom view of the front tunnel member of the present embodiment and FIGS. 9B, 9C and 9D are bottom views of the front tunnel member of modifications. FIG. 10A is a bottom view of a left-side front portion of the present lower vehicle-body structure of the vehicle, and FIG. 10B is a sectional view taken along line C-C of FIG. 10A. FIG. 11 is an explanatory view showing an arrangement of respective members in the present lower vehicle-body structure of the vehicle, FIGS. 12A and 12B are views showing an operation of the present lower vehicle-body structure of the vehicle in a vehicle frontal collision and a vehicle side collision, which focuses on a load transmitted to each member, and FIG. 13A is a view showing another operation of the present lower vehicle-body structure of the vehicle in the vehicle frontal collision and FIG. 13B is a view showing an operation of the present lower vehicle-body structure of the vehicle, which corresponds to FIG. 5. FIGS. 3, 11, 12A and 12B show a state in which a floor panel 2 is removed, respectively.

Figure 2:
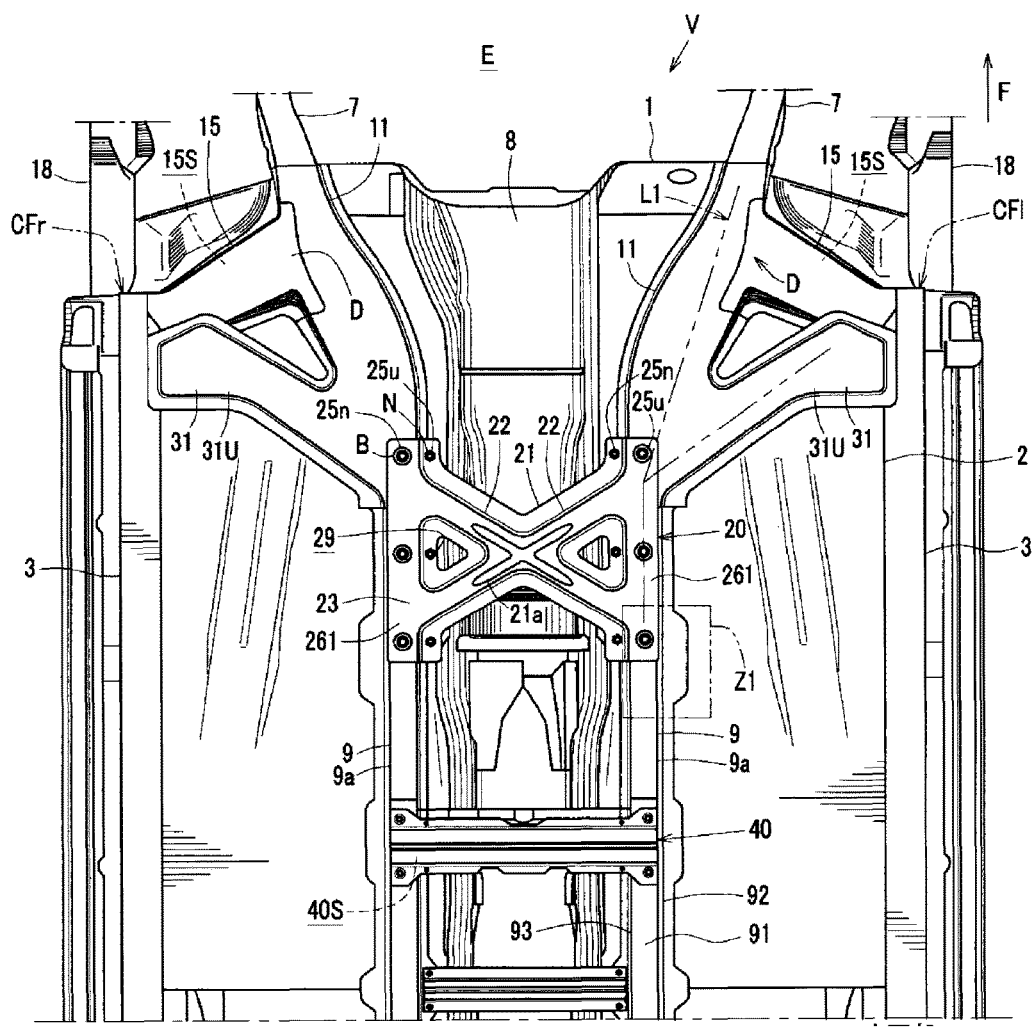
FIG. 2 is a bottom view of the present lower vehicle-body structure of the vehicle.
Figure 3:
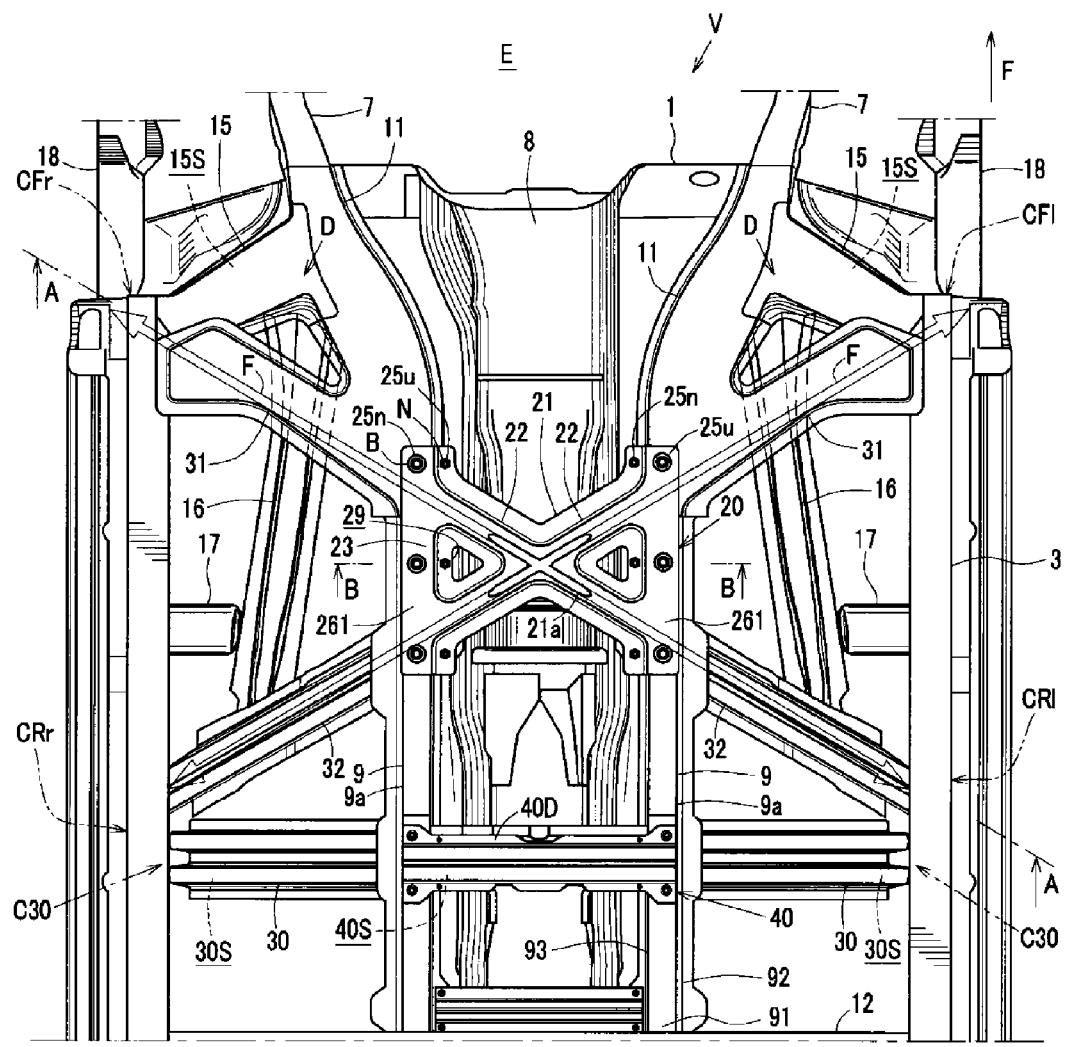
FIG. 3 is a bottom view of the present lower vehicle-body structure of the vehicle in which a floor panel is removed.

The vehicle V according to the present embodiment comprises, as shown in FIGS. 1-3, a dash panel 1 which partitions an engine room E from a vehicle compartment (not illustrated) and the floor panel 2 which forms a bottom face of the vehicle compartment. The dash panel 1 is provided to rise from a front end of the floor panel 2. The vehicle V further comprises a pair of side sills 3, 3 which extend in a vehicle longitudinal direction on both outward sides, in a vehicle width direction, of the floor panel 2.

Figure 4:
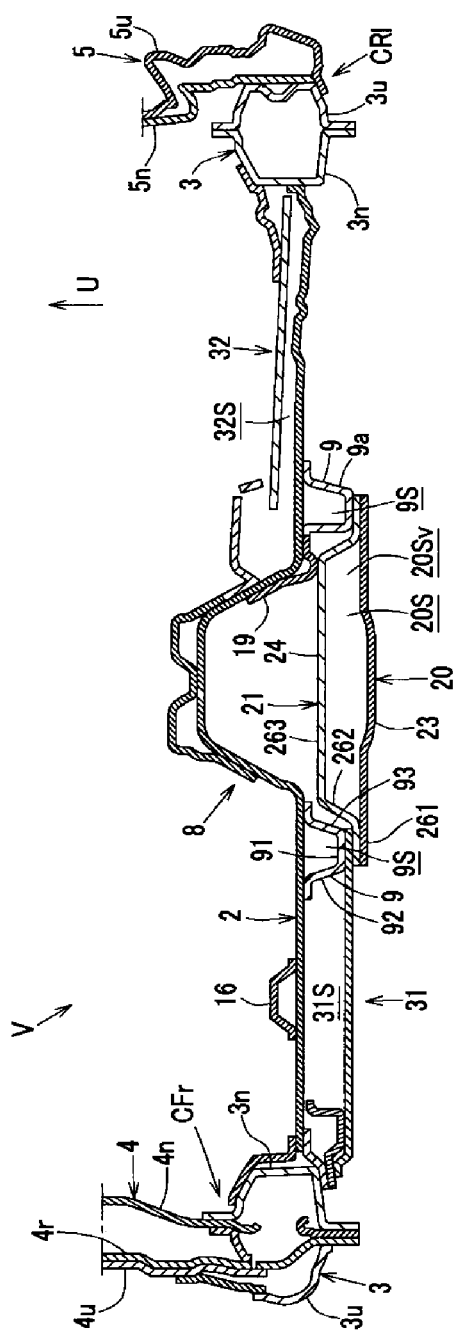
FIG. 4 is a sectional view taken along line A-A of FIG. 3.

The side sills 3 have a closed cross section, respectively, as shown in FIG. 4 and extend in the vehicle longitudinal direction at both-side edge portions, in the vehicle width direction, of the vehicle V. The floor panel 2 is connected to the both-side side sill 3 (see FIGS. 1, 2 and 4). Specifically, the side sill 3 comprises an inner panel 3n having a U-shaped cross section and an outer panel 3u, which are joined together at their upper-and-lower end portions so as to form the closed cross section. An outward end portion of the floor panel 2 is joined to a lower portion of an inward wall face of the inner panel 3n of the side sill 3 (see FIG. 4).

At the vehicle V are, as shown in FIGS. 1 and 4, provided right-and-left hinge pillars 4 which extend upward from respective front positions of the right-and-left side sills 3 and right-and-left center pillars 5 which extend upward from respective middle positions, in the vehicle longitudinal direction, of the right-and-left side sills 3.

The hinge pillar 4 comprises a hinge pillar outer 4u and a hinge pillar inner 4n, which form a hinge-pillar closed cross section which extends vertically. The hinge pillar 4 is a vehicle-body rigidity member to pivotally support a front door, not illustrated. The hinge pillar 4 is fixed vertically between a roof side rail 6 and the side sill 3, and hinge pillar reinforcements 4r, 4s are provided between the hinge pillar outer 4u and the hinge pillar inner 4n as required (see FIG. 4).

Herein, a connection portion of the hinge pillar 4 and the side sill 3 (the skirts of the hinge pillar 4) is configured such that its longitudinal width becomes larger toward a lower end portion of the hinge pillar 4 (see FIG. 1).

The center pillar 5 comprises a center pillar outer 5u and a center pillar inner 5n, which form a center-pillar closed cross section which extends vertically. The center pillar 5 is a vehicle-body rigidity member to pivotally support a rear door, not illustrated. The center pillar 5 is fixed vertically between the roof side rail 6 and the side sill 3 (see FIGS. 1 and 4). Herein, a connection portion of the center pillar 5 and the side sill 3 (the skirts of the center pillar 5) is configured such that its longitudinal width becomes larger toward a lower end portion of the center pillar 5 (see FIG. 1).

Herein, a space enclosed by the hinge pillar 4, the side sill 3, the center pillar 5, and the roof side rail 6 is set to be an ingress/egress opening 50F (door opening portion) for a passenger seated in a front seat, and a space enclosed by the center pillar 5, the side sill 3, a quarter pillar (not illustrated), and the roof side rail 6 is set to be an ingress/egress opening 50R (door opening portion) for a passenger seated in a rear seat (see FIG. 1).

Further, as shown in FIGS. 1-3, the vehicle V is provided with a pair of right-and-left front side frames 7 which extend in the vehicle longitudinal direction on both sides of the engine room E in front of the dash panel 1. The front side frame 7 has a rectangular closed cross section (not illustrated). As shown in FIGS. 2 and 3, a rear portion of the front side frame 7 is joined to a lower portion of the dash panel 1. At a rear end portion of the front side frame 7 is provided a front side frame extension portion 11 below the floor panel 2, which is configured to be continuous from the rear end portion of the front side frame 7, extend obliquely inward and rearward, and be connected to a front portion of a tunnel side frame 9, which will be described below.

The above-described front side frame extension portion 11 is attached to a lower face portion (a back face) of the floor panel 2 so as to form a front side frame extension portion closed-cross section portion 11S together with a lower face portion (a back face) of a floor tunnel 8 as shown in FIGS. 2, 3 and 5.

The floor tunnel 8 which extends in the vehicle longitudinal direction and protrudes upward (to a vehicle-compartment side) is, as shown in FIGS. 1-4, provided at a central portion, in the vehicle width direction, of the floor panel 2. A front end portion of the floor tunnel 8 is connected to the dash panel 1.

As shown in FIGS. 2, 3 and 4, a pair of right-and-left tunnel side frames 9 for reinforcing the floor tunnel 8 are attached to both edge portions of a lower face portion of the floor tunnel 8. Specifically, the both-side tunnel side frames 9, 9 are provided to extend straightly in the vehicle longitudinal direction roughly in parallel to each other, having a roughly constant distance therebetween, at a border area of the floor panel 2 and an outward-side flat portion of the floor tunnel 8.

As shown in FIGS. 4-7A, the tunnel side frame 9 includes a U-shaped portion 9a having a U-shaped (hat-shaped) cross section which opens upward. The U-shaped portion 9a comprises a bottom face portion 91, an outer face portion 92, and an inner face portion 93, and this U-shaped portion 9a is attached to a lower face portion of the border portion of the floor tunnel 8 and the floor panel 2 so as to form a tunnel side frame closed cross section portion 9S together with the lower face portion (back face) of the floor tunnel 8.

Further, as shown in FIG. 1, a rear end portion of the floor tunnel 8 is connected to a kick-up portion 12 (a kick-up panel 12) which rises obliquely upward from the floor panel 2.

The rear floor panel 13 is connected to the rear end portion of the above-described floor panel 2 via the kick-up portion 12.

Moreover, a pair of side sill rears 14, 14 which extend in the longitudinal direction of the vehicle V are fixedly joined to both sides, in the vehicle width direction, of the rear floor panel 13, respective front end portions of which are continuous from respective rear end portions of the right-and-left side sills 3 (see FIG. 1).

As shown in FIGS. 2 and 3, at each rear portion of the front side frames 7 is provided a torque box 15 which extends obliquely outward and rearward from this rear portion. This torque box 15 is a vehicle-body rigidity member to increase the vehicle-body rigidity, and an outward end portion, in the vehicle width direction, of the torque box 15 is directly joined to a front end of the side sill 3 so as to have a closed cross section 15S to effectively transmit a load applied to the front side frame 7.

Further, at an upper face portion of the floor panel 2 are, as shown in FIGS. 1, 3 and 4, provided a pair of right-and-left longitudinal members 16 (floor frames) which extend in the vehicle longitudinal direction, slanting outward, so as to form a closed cross section together with this upper face portion. The pair of right-and-left longitudinal members 16 are provided to overlap, in a plan view, with respective branch portions D of the torque boxes 15 arranged at the lower face portion of the floor panel 2 and the front side frame extension portions 11 (see FIGS. 1-3).

A rear portion of the longitudinal member 16 is connected near to a central portion of a floor upper inclination member 32, which will be described, specifically a portion of the floor upper inclination member 32 which is positioned outward, in the vehicle width direction, from the center of the floor upper inclination member 32 (see FIGS. 1 and 3).

Moreover, as shown by imaginary line s in FIG. 1, a rail-shaped seat bracket 60 as a seat structure member for a vehicle to attach a front seat for a passenger (not illustrated) is provided at the lower part of the vehicle V.

Specifically, a pair of rail-shaped seat brackets 60 are provided to extend roughly in parallel to each other at an inward-side position and an outward-side position of the floor panel 2 on each side of the vehicle. FIG. 1 illustrates the pair of seat brackets 60, 60 provided on the right side of the vehicle only.

A front end portion of one of the pair of seat brackets 60, 60 which is positioned at the outward-side position is supported at a seat support member 17.

As shown in FIGS. 1 and 3, the seat support member 17 is arranged at the upper face portion of the floor panel 2 in front of the floor upper inclination member 32, projecting inward from the side sill 3, and an inward end, in the vehicle width direction, of the seat support member 17 is joined to the longitudinal member 16.

Herein, while the seat support member 17 supports the rail-shaped seat bracket 60 which is the seat structure member of the vehicle in the present embodiment, the present invention is not limited to this structure and the seat for a passenger which is the seat structure member for the vehicle may be directly supported without the seat bracket 60.

Meanwhile, as shown in FIGS. 1-3, a pair of right-and-left apron reinforcements 18 are provided to extend in the longitudinal direction roughly in parallel to the front side frames 7 in the plan view at a position located outward and above the front side frames 7 at the front portion of the vehicle V.

The apron reinforcement 18 is a vehicle-body rigidity member which has an apron reinforcement closed cross section extending in the vehicle longitudinal direction and a rear end portion of which is joined to an upper end portion of the hinge pillar 4.

Also, as shown in FIGS. 1 and 3, a cross member 30 (No. 2.5 cross member 30), which extends straightly in the vehicle width direction substantially at the same position, in the vehicle longitudinal direction, as the center pillar 5 is connected to the side sill 3 and the floor tunnel 8, is provided above the floor panel 2.

The cross member 30 is attached to the upper face portion of the floor panel 2 so as to form a cross member closed cross section portion 30S together with an upper face portion of the floor tunnel 8 (see FIG. 3).

Further, as shown in FIG. 3, there are provided a pair of diagonally-extending inclination members 20, 31, 32 at the lower portion of the vehicle V, which are configured to interconnect respective connection portions CFr, CFl of the side sills 3 and the hinge pillars 4 and respective connection portions CRl, CRr of the other-side side sills 3 and the center pillars 5. The pair of diagonally-extending inclination members 20, 31, 32 are formed in a substantially X shape in the plan view by a front tunnel member 20, down-floor inclination members 31, and under-floor inclination members 32.

The front tunnel member 20, which is a member positioned at a cross position of the X-shaped diagonally-extending inclination members 20, 31, 32, is located substantially at the same position as a connection position of the under-floor inclination member 31 to the tunnel side frame 9 in the vehicle longitudinal direction (see FIGS. 2 and 3), and arranged substantially at the same longitudinal position as a position where the upper-floor inclination member 32 overlaps with the tunnel side frame 9 (see FIGS. 1 and 3).

As shown in FIGS. 2, 3, 8 and 9A, the front tunnel member 20 comprises an X-shaped portion 21 and is provided to extend over the floor tunnel 8 and connect both sides of a lower portion of the floor tunnel 8. Thereby, a load from the upper-floor inclination member 32, or a load from the under-floor inclination member 31 is transmitted to an opposite side, in the vehicle width direction, of the lower portion of the floor tunnel 8.

The X-shaped portion 21 includes ridgeline portions 22 (inclination portions) which respectively connect the under-floor inclination members 31 and the upper-floor inclination members 32 roughly straightly and cross in a roughly X shape in the plan view (see the same figures). Herein, a bead portion 21a which protrudes downward and is formed in an X shape is provided at a lower face of the cross portion of the X-shaped portion 21 (see FIGS. 2, 3, 6, 8 and 9A).

The front tunnel member 20 comprises, as shown in FIGS. 6 and 7A, a first face portion 261 which extends in the vehicle width direction, facing to the bottom face portion 91 of the tunnel side frame 9 (the tunnel side member 9), a second face portion 262 which extends upward from an inward end, in the vehicle width direction, of the first face portion 261, facing to the inner face portion 93 of the tunnel side frame 9, and a third face portion 263 which extends inward from an upper end of the second face portion 262.

Further, the front tunnel member 20 has through holes 29 which open vertically at both-side portions in the bottom view which are respectively enclosed by the first face portions 261 and the X-shaped portion 21 (see FIGS. 2, 3, 8 and 9A). The front tunnel member 20 further includes a lower panel 23 and an upper panel 24 which is positioned above the lower panel 23 (see FIGS. 4 and 6).

The lower panel 23 is configured in a recess shape to be concaved downward in a roughly X shape relative to a portion corresponding to the third face portion 263, i.e., front and rear edge portions of the X-shaped portion 21 and a peripheral portion of the through hole 29, such that a portion corresponding to the ridgeline portions 22 is substantially continuous to the first face portion 261.

The upper panel 24 is configured substantially in the same shape as the lower panel 23 in the plan view, and the first face portion 261 of the upper panel 24 is configured stepwise via the vertically-extending second face portion 262 such that it is positioned at a lower level than the flat-shaped third face portion 263 (see the same figures).

As shown in FIGS. 4 and 6, the front tunnel member 20 is arranged below the floor tunnel 8 in a state in which the upper panel 24 and the lower panel 23 face to each other vertically such that a closed-cross section portion 20S (hereafter, referred to as "front tunnel member closed-cross section portion 20S") is formed at the X-shaped portion 21.

Herein, the first face portion 261 of the front tunnel member 20 and the bottom face portion 91 of the tunnel side frame 9 face to each other, and the second face portion 262 of the front tunnel member 20 and the inner face portion 93 of the tunnel side frame 9 face to each other (see FIGS. 4, 6, 7A and 8).

The front tunnel member 20 is fastened to plural points of the both outer edges, in the vehicle width direction, of the floor tunnel 8 of the floor panel 2 with bolts B and nuts N as shown in FIGS. 2, 3, 6, 7A, 8 and 9A. The front tunnel member 20 is fastened to the tunnel side frames 9 at fastening portions 25 (25u, 25n) in a state in which the upper panel 24 and the lower panel 23 are formed integrally by being fastened together with the bolts B and nuts N.

Specifically, as shown in FIG. 7A, the front tunnel member 20 is attached to the vehicle body with the bolts B and nuts N by fastening the first face portion 261 to the bottom face portion 91 of the tunnel side frame 9 and fastening the third face portion 263 to the floor tunnel 8 via the bracket 19.

Herein, as shown in FIGS. 6, 7A, 8 and 9, the fastening portion 25 where the first face portion 261 is fastened to the bottom face portion 91 of the tunnel side frame 9 is set to be the outside fastening portions 25u, and the fastening portion 25 where the third face portion 263 is fastened to the floor tunnel 8 is set to be the inside fastening portions 25n.

Herein, as shown in FIGS. 2, 3, 8 and 9A, the front tunnel member 20 is configured such that pairs of outside fastening portions 25u and inside fastening portions 25n are respectively arranged at a front end portion, a middle portion, and a rear end portion of that on both sides in the vehicle width direction, thereof. These pairs of outside fastening portions 25u and inside fastening portions 25n are provided substantially at the same positions in the vehicle longitudinal direction.

Specifically, as shown in FIGS. 8 and 9A, the respective outside fastening portions 25u at the front end portion, the middle portion, and the rear end portion of the front tunnel member 20 are set to be an outside front end fastening portion 25uf, an outside middle fastening portion 25um, and an outside rear end fastening portion 25ur, and also the respective inside fastening portions 25n at the front end portion, the middle portion, and the rear end portion of the front tunnel member 20 are set to be an inside front end fastening portion 25nf, an inside middle fastening portion 25nm, and an inside rear end fastening portion 25nr. The outside front end fastening portion 25uf and the inside front end fastening portion 25nf are provided substantially at the same front-end position of the front tunnel member 20 in the vehicle longitudinal direction, the outside middle fastening portion 25um and the inside middle fastening portion 25nm are provided substantially at the same middle position of the front tunnel member 20 in the vehicle longitudinal direction, and the outside rear end fastening portion 25ur and the inside rear end fastening portion 25nr are provided substantially at the same rear-end position of the front tunnel member 20 in the vehicle longitudinal direction (see the same figures).

Herein, the inside front end fastening portion 25nf is the one for fastening the front end portion of the X-shaped portion 21 having the front tunnel member closed-cross section portion 20S, the inside rear end fastening portion 25nr is the one for fastening the rear end portion of the X-shaped portion 21, and the inside middle fastening portion 25nm is the one for fastening a middle portion, in the vehicle longitudinal direction, of a pair of ridgeline portions 22, 22 forming the X-shaped portion 21 (see FIGS. 8 and 9A).

Further, as shown in FIG. 5, the above-described front tunnel member 20 has a closed-cross section portion 20Sv which is of a roughly V shape opening rearward in the plan view (hereafter, referred to as "front tunnel member V-shaped closed-cross section portion 20Sv") at a lower half, in the vehicle longitudinal direction, of the X-shaped front tunnel member closed-cross section portion 20S. The front tunnel member V-shaped closed-cross section portion 20Sv is configured to be continuous to the upper-floor inclination member 32 (see FIGS. 3 and 4).

Subsequently, the above-described under-floor inclination members 31 will be described referring to FIGS. 2 and 3. A pair of under-floor inclination members 31 are positioned in front of the cross portion of the X-shaped diagonally-extending inclination members 20, 31, 32 at both outward sides of the floor tunnel 8 of the floor panel 2. The under-floor inclination members 31 are provided below the floor panel 3 to extend obliquely rearward and inward from the connection portions CFr, CFl of the side sills 3 and the hinge pillars 4.

As shown in FIGS. 4 and 5, the under-floor inclination member 31 has a U-shaped portion which opens upward and flange portions which extend outward, in the vehicle width direction, from side end portions of its opening. These flange portions are joined to the lower face portion of the floor panel 2, so that a closed-cross section portion 31S (hereafter, referred to as "under-floor inclination member closed-cross portion 31S") is formed between the under-floor inclination member 31 and the lower face portion of the floor panel 2.

A front end of the under-floor inclination member 31 is joined to the front end of the side sill 3 via the torque box 15 as shown in FIGS. 2, 3 and 10A. That is, as shown by an area Z3 in FIG. 10B, at the front end of the side sill 3 are joined together the front-end lower portion of the side sill 3, the torque box 15, and the under-floor inclination member 31 in order from above. Herein, reference character 52 in FIG. 10B denotes a reinforcing member.

Meanwhile, a rear portion of the under-floor inclination member 31 is integrally connected to a rear portion of the front side flame extension portion 11 and joined to a front end of the tunnel side frame 9 as shown in FIGS. 2, 3 and 10A. Further, at least a single ridgeline portion 31U (an upper face portion 31U) of the both-side under-floor inclination members 31 and at least a single ridgeline portion 22 of the X-shaped portion 21 of the front tunnel member 20 are configured to be positioned substantially in line in the plan view, thereby improving the load-transmission performance.

Also, as shown in FIGS. 1 and 3, a pair of upper-floor inclination members 32 described above (inclination No. 2 cross 32) are positioned in back of the cross portion of the X-shaped diagonally-extending inclination members 20, 31, 32 at both the outward sides of the floor tunnel 8 of the floor panel 2. Respective outward rear portions of the upper-floor inclination members 32 are joined to the connection portions CRl, CRr of the side sills 3 and the center pillars 5, and the upper-floor inclination members 32 are arranged above the floor panel 2 such that they extend obliquely forward and inward from the connection portions CRl, CRr, in other words, from a position located in front of the connection portions C30 of the side sills 3 and the cross member 30 (see FIG. 3) at an area located in back of the longitudinal members 16 (see the same figures).

As shown in FIGS. 1 and 4, the upper-floor inclination member 32 has a U-shaped portion which opens downward and flange portions which extend outward, in the vehicle width direction, from side end portions of the opening. These flange portions are joined to the upper face portion of the floor panel 2, so that a closed-cross section portion 32S (hereafter, referred to as "upper-floor inclination member closed-cross portion 32S") is formed between the upper-floor inclination member 32 and the upper face portion of the floor panel 2.

As shown in FIGS. 1 and 3, a front end portion of the upper-floor inclination member 32 is joined to a portion of a side edge portion of the floor tunnel 8 which corresponds to the rear end of the front tunnel member 20 such that the upper-floor inclination member 32 is straightly continuous to the ridgeline portion 22 of the X-shaped portion 21. Herein, a position of the rear end of the front tunnel member 20 substantially corresponds to an arrangement position of the seat support member 17 in the vehicle longitudinal direction (see FIG. 3).

Further, as shown in FIG. 4, the upper-floor inclination member closed-cross portion 32S and the front tunnel member closed-cross section portion 20S are configured to overlap with each other in the vehicle width direction in the front view at a joint position where the front end portion of the upper-floor inclination member 32 is joined to the side edge portion of the floor tunnel 8.

Meanwhile, as shown at a frame structure L1 illustrated by imaginary lines in FIG. 2, the under-floor inclination member 31, the front side frame extension portion 11, and the tunnel side frame 9 are all arranged below the floor panel 2 and formed in a rightly Y shape in the front view.

Further, as shown at a frame structure L2 illustrated by imaginary lines in FIG. 5, the front tunnel member closed-cross section portion 20S, the tunnel side frame closed-cross section portion 9S, the front side frame extension portion closed-cross section portion 11S, and the under-floor inclination member closed-cross section portion 31S form together a roughly Y shape in the plan view, and at least part of these closed-cross section portions 20S, 9S, 11S, 31S is formed in the same plane. In the present embodiment, all of the closed-cross section portions 20S, 9S, 11S, 31S including the torque-box closed-cross section portion 15S (see FIGS. 2 and 3) are formed in the same plane.

Moreover, as shown at a frame structure L31 illustrated by imaginary lines in FIG. 11, the under-floor inclination member 31, the front side frame extension portion 11, and the torque box 15 are configured to form a triangular shape in the plan view. Meanwhile, as shown at a frame structure L32 illustrated by imaginary lines in FIG. 11, a one-side half part of the X-shaped portion 21 of the front tunnel member 20 including the cross portion and the tunnel side frame 9 are configured to form another triangular shape. Thus, a pair of triangular-shaped frame structures L31, L32 with their peaks abutting on each other in the plan view are provided at the lower portion of the vehicle.

As shown in FIGS. 2 and 3, a rear tunnel member 40 which straightly extends over the floor panel 8 and interconnects the both sides of the lower face of the floor tunnel 8 of the floor panel 2 is provided at a position located in back of the front tunnel member 20, specifically at the same longitudinal position as an arrangement position of the cross member 30. The rear tunnel member 40 is provided to be roughly straightly continuous to the cross member 30 extending in the vehicle width direction in the plan view (see FIG. 3). The rear tunnel member 40 comprises an upper panel (not illustrated) and a lower panel 40D, and has a rear tunnel member closed-cross section portion 40S which is formed by these panels joined vertically and extends straightly in the vehicle width direction (see FIGS. 2 and 3).

Herein, as shown at a frame structure L4 illustrated by imaginary lines in FIG. 11, the upper-floor inclination member closed-cross section portions 32S, the cross member closed-cross section portions 30S, the front tunnel member V-shaped closed-cross section portion 20Sv, and the rear tunnel member closed-cross section portion 40S are configured to form a roughly triangular shape in the plan view.

The lower vehicle-body structure of the vehicle V of the above-described embodiment can provide the following operation and effects. The lower vehicle-body structure of the vehicle V of the present embodiment comprises the right-and-left side sills 3, 3 extending in the vehicle longitudinal direction at the both outward sides, in the vehicle width direction, of the vehicle body, the floor panel 2 connected to the right-and-left side sills 3, 3, the floor tunnel 8 protruding upward at the central portion of the floor panel 2, the tunnel side frames 9, 9 extending in the vehicle longitudinal direction along the both sides, in the vehicle width direction, of the floor tunnel 8, and the front tunnel member 20 connecting the right-and-left lower portions of the floor tunnel 8, wherein the tunnel side frame 9 includes the U-shaped portion 9a having the U-shaped cross section which opens upward, the U-shaped portion 9a comprising the bottom face portion 91, the outer face portion 92, and the inner face portion 93 (see FIGS. 4, 6 and 7A), the front tunnel member 20 comprises the first face portion 261 which faces to the bottom face portion 91 of the tunnel side frame 9, the second face portion 262 which faces to the inner face portion 93 of the tunnel side frame 9, and the third face portion 263 which extends inward from the upper end of the second face portion 262 (see the same figures), and the front tunnel member 20 is attached to the vehicle body by attaching the first face portion 261 to the bottom face portion 91 of the tunnel side frame 9 and attaching the third face portion 263 to the floor tunnel 8 via the upper panel 4 and the bracket 19, respectively (see the same figures).

According to this structure, the front tunnel member 20 can properly contact the inner face portion 93 of the tunnel side frame 9 when the collision load is inputted, so that the smooth load transmission at the lower portion of the floor tunnel 8 can be achieved.

Moreover, according to the embodiment of the present invention, the outside fastening portion 25u where the first face portion 261 is directly fastened to the bottom face portion 91 of the tunnel side frame 9 with the bolt B and nut N and the inside fastening portion 25n where the third face portion 263 is fastened to the floor tunnel 8 with the bolt B and nut N via the bracket 19 are arranged substantially at the same longitudinal position (see FIGS. 2, 3, 6, 7A, 8 and 9A).

According to this embodiment, since the plural outside fastening portions 25u and the plural inside fastening portions 25n are arranged substantially at the same longitudinal positions of the front end position, the roughly central position, and the rear end position, respectively, the structure may not get twisted even if a large load is added in the vehicle collision. Thereby, the attachment strength can be increased, compared with a case in which the above-described fastening portions are arranged at different longitudinal positions, respectively.

According to this embodiment, the above-described effect that the load-transmission performance at the lower portion of the floor tunnel 8 can be achieved can be enhanced further.

Further, the lower vehicle-body structure of the vehicle V of the present embodiment comprises the right-and-left side sills 3, 3 which extend in the vehicle longitudinal direction at the both outward sides, in the vehicle width direction, of the vehicle body, the right-and-left hinge pillars 4, 4 which extend upward from the respective front positions of the right-and-left side sills 3, 3, the right-and-left center pillars 5, 5 which extend upward from the respective middle positions, in the vehicle longitudinal direction, of the right-and-left side sills 3, 3, the floor panel 2 which is connected to the right-and-left side sills 3, 3, the floor tunnel 8 which protrudes upward at the central portion of the floor panel 2, and a pair of diagonally-extending inclination members 20, 31, 32 which are formed in the substantially X shape in the plan view and provided above or below the floor panel 2, each of the pair of inclination members 20, 31, 32 being configured to interconnect the connection portions CFr, CFl of one of the right-and-left side sills 3 and the hinge pillar 4 and the connection portions CRl, CRr of the other of the right-and-left side sills 3 and the center pillar 5 (see FIGS. 1-3, particularly the load F in FIG. 3).

According to the present lower vehicle-body structure, the load-transmission performance between the hinge pillar 4 provided at the front end of the one-side side sill 3 and the center pillar 5 provided at the other-side side sill 3 can be improved in the SOL or vehicle side collisions.

Specifically, when the vehicle has the frontal collision, the under-floor inclination member 31 can transmit the load from the side sill 3 to the tunnel side frame 9, and the upper-floor inclination member 32 can transmit the load from the tunnel side frame 9 to the side sill 3. When the vehicle has the side collision, the upper-floor inclination member 32 can transmit the load from the side sill 3 to the tunnel side frame 9, and the under-floor inclination member 31 can transmit the load from the tunnel side frame 9 to the side sill 3.

According to the embodiment of the present invention, the pair of inclination members 20, 31, 32 comprise the under-floor inclination members 31 which are provided below the floor panel 2 and extend obliquely rearward and inward, in the vehicle width direction, from the connection portions CFr, CFl of the right-and-left side sills 3 and the right-and-left hinge pillars 4, the upper-floor inclination members 32 which are provided above the floor panel 2 and extend obliquely forward and inward, in the vehicle width direction, from the connection portions CRl, CRr of the left-and-right side sills 3 and the left-and-right center pillars 5, and the front tunnel member 20 as the tunnel member comprising the roughly X-shaped portion 21 (see FIGS. 1-3).

According to this embodiment, the load transmission between the hinge pillar 4 provided at the front end of the side sill 3 and the center pillar 5 provided at the opposite-side side sill 3 in the SOL or vehicle side collisions can be achieved with the lightweight structure (see the load F in FIG. 3).

Further, in the embodiment of the present invention, the inside of the X-shaped portion 21 of the front tunnel member 20 is the closed-cross section portion 20 (see FIGS. 4 and 5), and the front tunnel member closed-cross section portion 20S as the closed-cross section portion 20S of the roughly X-shaped portion 21 of the front tunnel member 20 is configured to overlap with, in the vehicle width direction, the upper-floor inclination closed-cross section portion 32S as the closed-cross section portion which is formed by the upper-floor inclination member 32 and the floor panel 2 in the front view of the vehicle (see FIG. 4).

According to this embodiment, since the closed-cross section portions 20S, 32S have overlapping, the load can be transmitted properly without generating any bucking or the like which may be caused by stress concentration on a specified portion. Thereby, the above-described effect that the load transmission between the hinge pillar 4 and the opposite-side center pillar 5 in the SOL or vehicle side collisions can be achieved can be further enhanced.

Further, the lower vehicle-body structure of the vehicle V of the present embodiment comprises the right-and-left side sills 3, 3 which extend in the vehicle longitudinal direction at the both outward sides, in the vehicle width direction, of the vehicle body, the right-and-left center pillars 5, 5 as pillars which extend upward from the respective middle positions, in the vehicle longitudinal direction, of the right-and-left side sills 3, 3, the floor panel 2 which is connected to the right-and-left side sills 3, 3, the floor tunnel 8 which protrudes upward at the central portion of the floor panel 2, the cross members 30 which extend substantially in the vehicle width direction roughly at the same longitudinal position as the center pillars 5 and connect to the side sills 3 and the floor tunnel 8, and the upper-floor inclination members 32 which are provided above the floor panel 2, extend obliquely forward and inward from the positions located in front of the connection portions C30, and connect to the floor tunnel 8 (see FIGS. 1 and 3).

According to this structure, as shown in FIG. 12B, a load Fs inputted to the lower portion of the center pillar 5 in the vehicle side collision can be efficiently transmitted through plural load paths, such as the cross member 30 or the inclination member 32 (see loads Fs1, Fs2 in FIG. 12B).

According to the embodiment of the present invention, the front tunnel member 20 which interconnect the right-and-left lower portions of the floor tunnel 8 is provided substantially at the same longitudinal position as the connection location where the upper-floor inclination member 32 is connected to the floor tunnel 8 (see FIG. 3).

According to this structure, the load inputted to the lower portion of the center pillar 5 in the vehicle side collision can be efficiently transmitted to the opposite side in the vehicle width direction (see the load F in FIG. 3).

Moreover, according to the embodiment of the present invention, the rear tunnel member 40 interconnecting the right-and-left lower portions of the floor tunnel 8 is provided at the connection position of the cross member 30 to the floor tunnel 8 (see FIGS. 2 and 3), and the front tunnel member 20 includes the front tunnel member V-shaped closed-cross section portion 20Sv which is the roughly V-shaped closed-cross section portion opening rearward in the plan view which is provided to be continuous to the upper-floor inclination member 32 (see FIG. 5). Also, the upper-floor inclination member closed-cross section portions 32S which are the closed-cross section portions formed by the upper floor inclination members 32 and the floor panel 2 (see FIG. 4), the cross member closed-cross section portions 30S which are the closed-cross section portions formed by the cross members 30 and the floor panel 2, the front tunnel member V-shaped closed-cross section portion 20Sv, and the rear tunnel member closed-cross section portion 40S which is the closed-cross section portion of the rear tunnel member 40 form together the roughly triangular shape in the plan view (see FIG. 11).

According to this structure, since the triangular shape (truss configuration) in the plan view is formed by these closed-cross section portions 20Sv, 30S, 32S, 40S, the strength against the vehicle side collision can be increased, and the above-described effect that the load inputted to the lower portion of the center pillar 5 can be efficiently transmitted through the plural load paths in the vehicle side collision can be further enhanced.

Further, the lower vehicle-body structure of the vehicle V of the present embodiment comprises the right-and-left side sills 3, 3 which extend in the vehicle longitudinal direction at the both outward sides, in the vehicle width direction, of the vehicle body, the floor panel 2 which is connected to the right-and-left side sills 3, 3, the floor tunnel 8 which protrudes upward at the central portion of the floor panel 2, the dash panel 1 which extends upward from the front portion of the floor panel 2, the right-and-left front side frames 7, 7 which extend in the vehicle longitudinal direction in front of the dash panel 1, the torque boxes 15 which extend obliquely rearward and outward from the rear portions of the front side frames 7 and connect to the front portions of the side sills 3, the tunnel side frames 9, 9 which are provided below the floor panel 2 to extend in the vehicle longitudinal direction along the both sides, in the vehicle width direction, of the floor tunnel 8, the front side frame extension portions 11 which extend obliquely rearward and inward from the rear portions of the front side frames 7, 7 and connect to the front portions of the tunnel side frames 9, and the right-and-left longitudinal members 16 which are configured such that their respective front end portions overlap with the respective branch portions D of the torque boxes 15 provided at the rear portions of the front side frames 7 and the front side frame extension portions 11 in the plan view and extend obliquely rearward and outward, respectively (see FIGS. 1 and 3).

According to the above-described structure, as shown in FIG. 12A, a frontal-collision load Ff is dispersed and transmitted by being divided into three directions as a load Ff1 acting along the torque box 15, a load Ff2 acting on the front side frame extension portion 11, and a load Ff3 acting along the longitudinal member 16, so that the load-transmission efficiency in the vehicle frontal collision can be improved.

Also, according to the embodiment of the present invention, the longitudinal members 16 are provided above the floor panel 2, the upper-floor inclination members 32 which extend obliquely forward and inward from the right-and-left side sills 3 at the position located in back of the longitudinal members 16 and connect to the floor tunnel 8 are provided above the floor panel 2, and the rear portion of the longitudinal member 16 is connected to the middle portion of the upper-floor inclination member 32 (see FIGS. 1, 3 and 4).

According to this structure, the load-transmission efficiency in the vehicle frontal collision can be improved by the above-described dispersion and transmission of the frontal-collision load Ff to the three directions (see the loads Ff1, Ff2, Ff3 in FIG. 12A).

Further, according to the present invention, the seat support members 17 which support the seat brackets 60 as the seat structure member for the vehicle are provided to protrude inward, in the vehicle width direction, from the side sills 3 at the positions located in front of the upper-floor inclination members 32, and the longitudinal members 16 are joined to the seat support members 17 (see FIGS. 1 and 3).

According to this structure, the frontal-collision load Ff can be dispersed and transmitted by being further divided into another direction as a load Ff4 acting along the seat support member 17 (see FIG. 12A), and also the support rigidity of the seat bracket 60 can be improved.

Also, the lower vehicle-body structure of the vehicle V of the present embodiment comprises the right-and-left side sills 3, 3 extending in the vehicle longitudinal direction at the both outward sides, in the vehicle width direction, of the vehicle body, the floor panel 2 connected to the right-and-left side sills 3, 3, the floor tunnel 8 protruding upward at the central portion of the floor panel 2, the dash panel 1 extending upward from the front portion of the floor panel 2, the right-and-left front side frames 7, 7 extending in the vehicle longitudinal direction in front of the dash panel 1, and the tunnel side frames 9, 9 extending in the vehicle longitudinal direction along the both sides, in the vehicle width direction, of the floor tunnel 8, wherein the front side frame extension portion 11 which is provided below the floor panel 2 to connect the rear portion of the front side frame 7 and the front portion of the tunnel side frame 9, the under-floor inclination member 31 which is provided below the floor panel 2 to connect the connection portion CFr or CFl of the side sill 3 and the hinge pillar 4 and the front portion of the tunnel side frame 9, and the tunnel side frame 9 are formed in the rightly Y shape in the plan view (see L1 illustrated by the imaginary lines in FIG. 2).

According to this structure, as shown in FIG. 13A, the front-collision load Ff is transmitted and dispersed to the side sill 3 and the under-floor inclination member 31 (see the loads Ff1, Ff2), and also the loads Ff2, Ff3 which are transmitted through the under-floor inclination member 31 and the front side frame extension portion 11 are intensively transmitted to the tunnel side frame 9 on the rear side where the load decreases (see the load Ff4), so that the load transmission can be achieved efficiently with the light structure.

According to the present embodiment, the front tunnel member 20 as the tunnel member which connects the right-and-left lower portions of the floor tunnel 8 is provided, this front tunnel member 20 includes the front tunnel member closed-cross section portion 20S as the closed-cross section portion which extends obliquely relative to the vehicle longitudinal direction in the plan view, and further the front tunnel member closed-cross section portion 20S, the tunnel side frame closed-cross section portion 9S as the closed-cross section portion which is formed by the tunnel side frame 9, the front side frame extension portion closed-cross section portion 11S as the close-cross section portion which is formed by the front side frame extension portion 11 and the floor panel 2, and the under-floor inclination member closed-cross section portion 31S are configured to form the roughly X shape in the plan view, wherein these closed-cross section portions 20S, 9S, 11S, 31S are formed on the same plane (see L2 illustrated by imaginary lines in FIG. 5).

According to this structure, as shown in FIG. 13B, since the closed-cross section portions 20S, 9S, 11S, 31S are formed continuously on the same plane, the efficient load dispersion, including the load transmission to the opposite side in the vehicle width direction (see the load Ff5), when the frontal-collision loads Ff2, Ff3 are inputted can be achieved (see the loads Ff2-Ff5 in FIG. 13B).

Moreover, in the present embodiment, there are provided a pair of center pillars 5, 5 extending upward from the respective middle positions, in the vehicle longitudinal direction, of the right-and-left side sills 3, 3, and the upper-floor inclination members 32 connect to the connection portions CRl, CRr of the side sills 3 and the center pillars 5 (see FIGS. 1, 3 and 4).

According to this structure, the performance of the load transmission from the center pillar 5 to the upper-floor inclination member 32 can be improved, thereby achieving the efficient transmission of the side-collision load Fs from the center pillar 5 (see the loads Fs1, Fs2 in FIG. 12B).

Further, in the present embodiment, there are provided the right-and-left under-floor inclination members 31, 31 which are provided below the floor panel 2 and extend obliquely rearward and inward from the respective front portions of the right-and-left side sills 3, 3, the front tunnel member 20 includes the X-shaped portion 21 which is of the X shape in the plan view, and at least the single upper face portions 31U (ridgeline portion) of the under-floor inclination member 31 (see FIG. 2) and at least the single ridgeline portion 22 are arranged on the roughly straight line in the plan view (see FIGS. 2-5). According to this structure, the load-transmission performance can be further enhanced.

In correspondence between the present invention and the above-described embodiment, the tunnel member corresponds to the front tunnel member 20. Likewise, the two portions of the attaching correspond to the outside fastening portions 25u (25uf, 25um, 25ur) and the inside fastening portions 25n (25nf, 25nm, 25nr). However, the present invention is not to be limited to the above-described embodiment only.

Figure 14A:
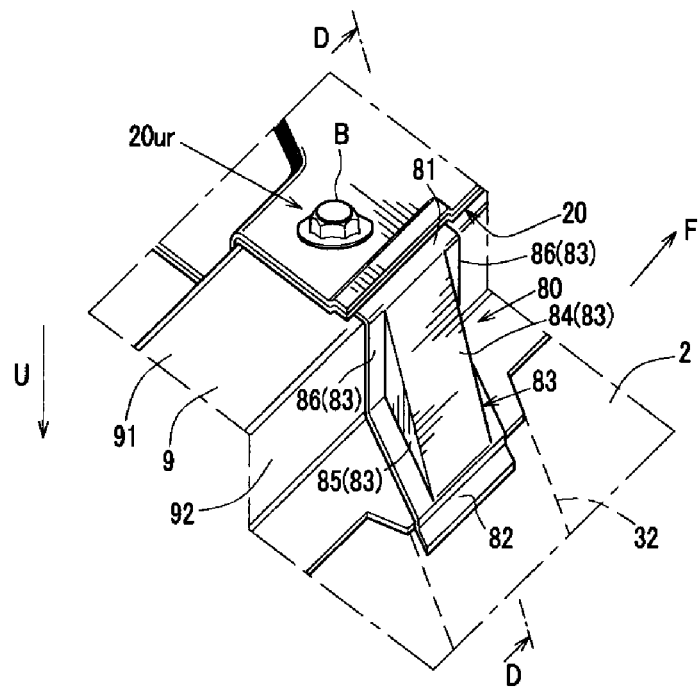
FIGS. 14A and 14B are explanatory views of a lower vehicle-body structure of the vehicle of another embodiment.
Figure 14B:
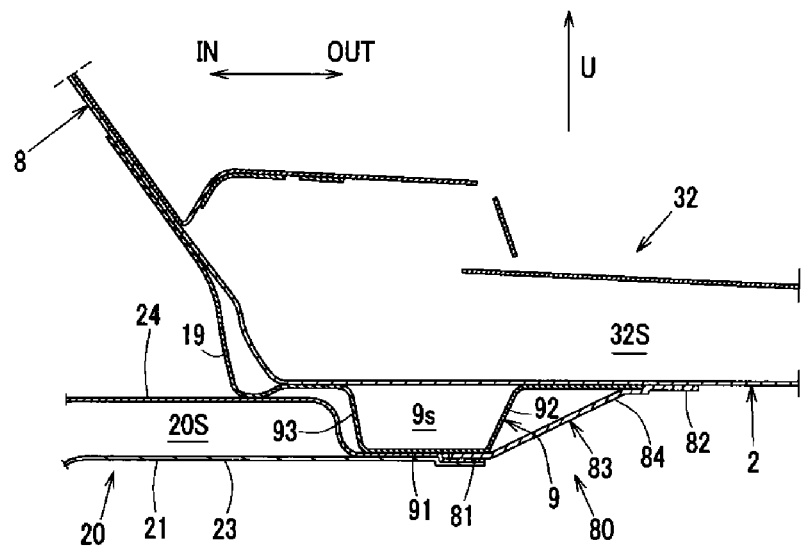
Figure 15:
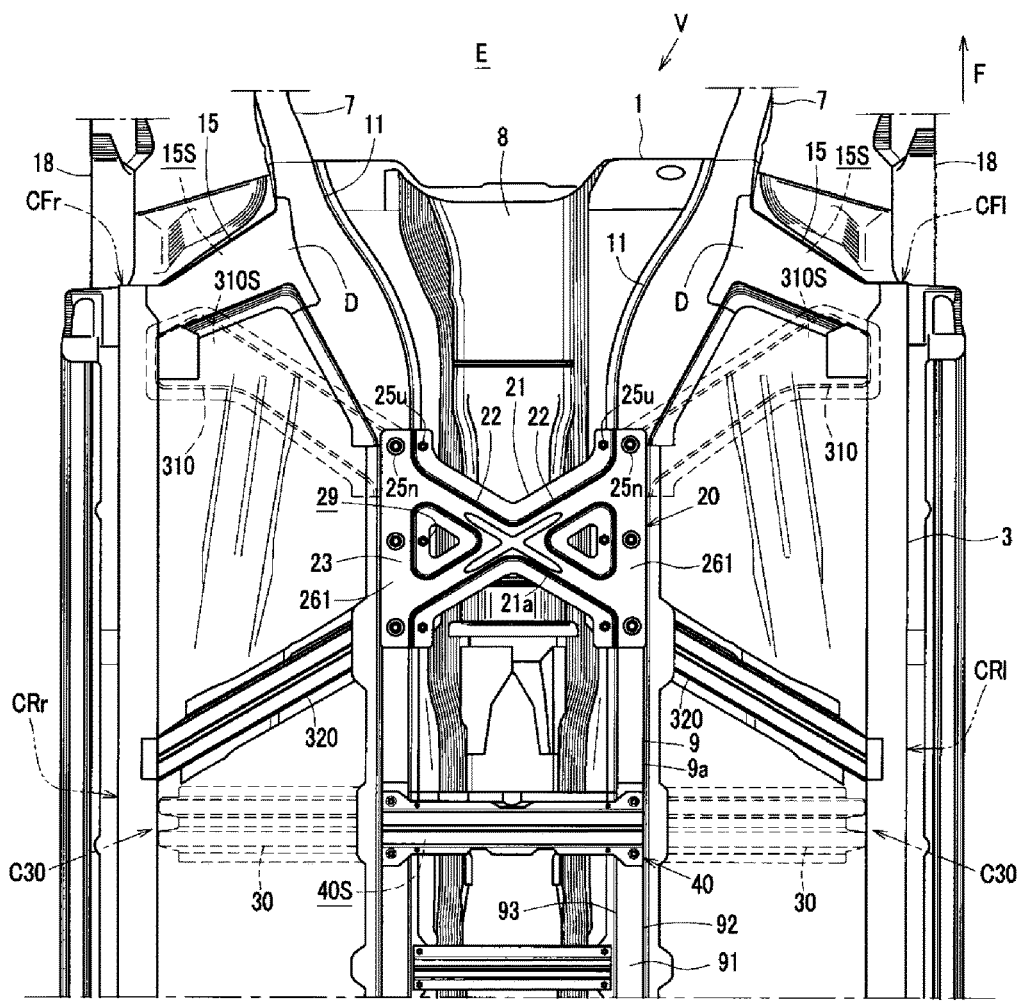
FIG. 15 is a bottom view of a lower vehicle-body structure of the vehicle of another embodiment.
Figure 16A:
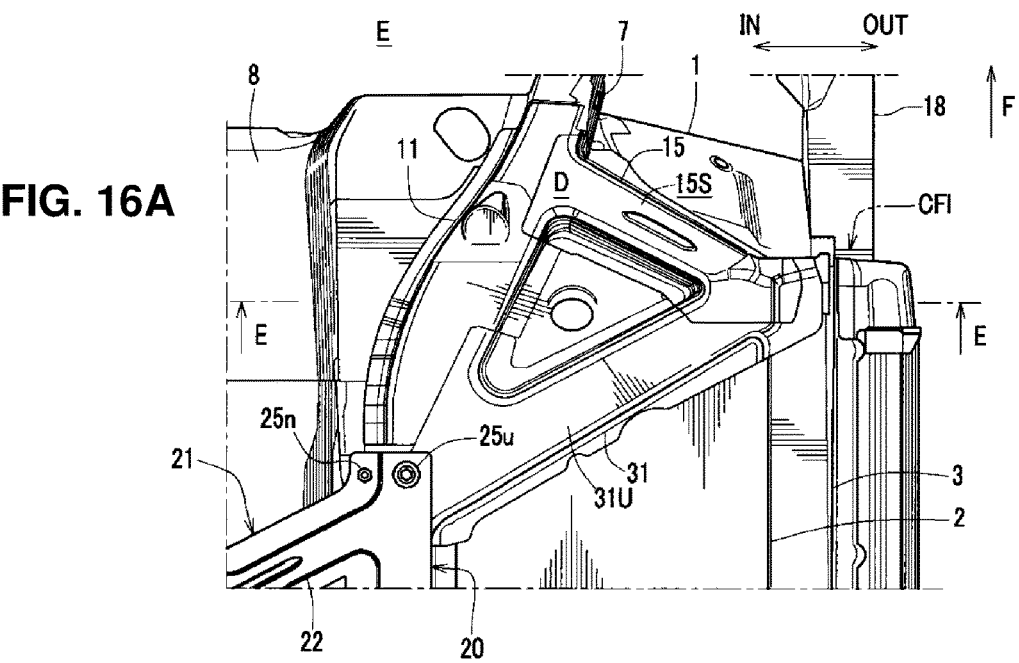
FIGS. 16A and 16B are explanatory views of a lower vehicle-body structure of the vehicle of another embodiment.
Figure 16B:
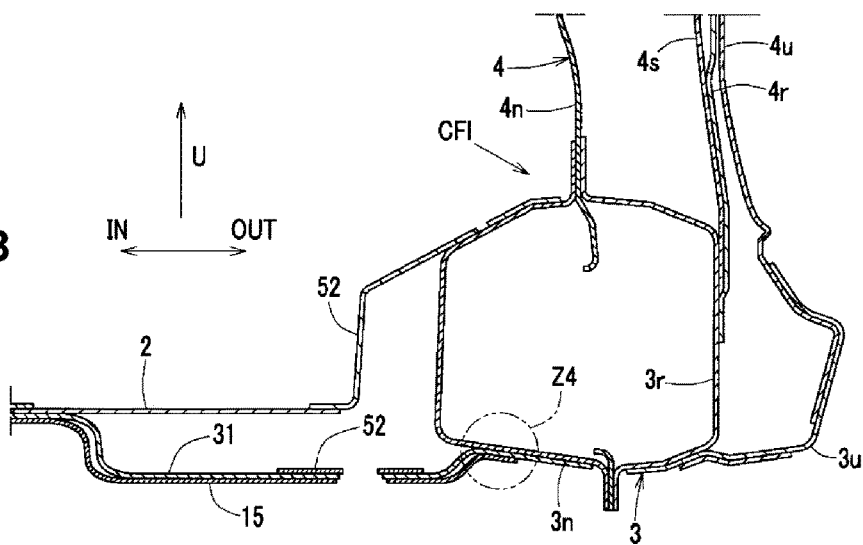
Figure 17:
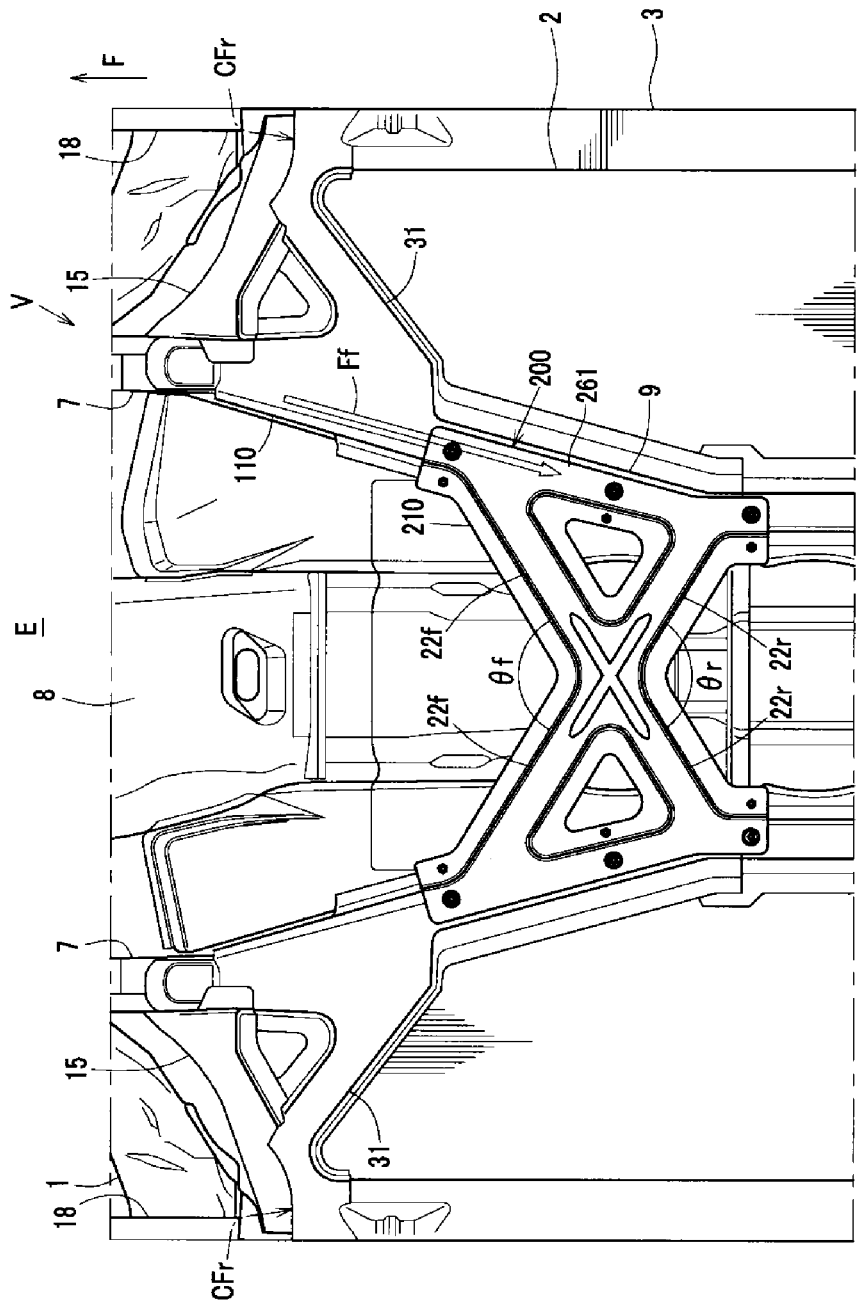
FIG. 17 is a bottom view of a vehicle front side showing a lower vehicle-body structure of the vehicle of another embodiment.

For example, the lower vehicle-body structure of the vehicle V according to the present invention can include various embodiments, and different embodiments from the above-described embodiment will be described below referring to FIGS. 14-17. Herein, FIGS. 14A and 14B are explanatory views of a lower vehicle-body structure of the vehicle of another embodiment, specifically, FIG. 14A being a perspective view of the embodiment which is provided with a bridge at an area Z1 in FIG. 2, and FIG. 14B is a sectional view taken along line D-D of FIG. 14A. FIG. 15 is a bottom view of a lower vehicle-body structure of the vehicle of another embodiment. FIGS. 16A and 16B are explanatory views of a lower vehicle-body structure of the vehicle of another embodiment in which a vertical positional relationship of the torque box and the inclination member is set upside down, specifically, FIG. 16A being a bottom view of a front portion of a left side of the lower vehicle-body structure of the embodiment, and FIG. 16B being a sectional view taken along line E-E of FIG. 16A. FIG. 17 is a bottom view of a vehicle front side showing a lower vehicle-body structure of the vehicle of another embodiment.

For example, as shown in FIGS. 14A and 14B, a connecting member 80 (bridge) which connects the lower face of the tunnel side frame 9 and the lower face of the floor panel 2 may be provided to at least partially overlap with the upper-floor inclination member 32 in the plan view.

Specifically, the connecting member 80 comprises a tunnel side frame joint piece 81, a floor panel joint piece 82, and a connection portion 83 which are formed integrally.

The tunnel side frame joint piece 81 is formed in a plane shape so as to contact the bottom face portion 91 (lower face) of the tunnel side frame 9.

The floor panel joint piece 82 is formed in a plane shape so as to contact the lower face of the floor panel 2 and extends obliquely outward and rearward from the outer face portion 92 of the tunnel side frame 9 in the plan view (see FIG. 14A).

The connection portion 83, which connects the tunnel side frame joint piece 81 and the floor panel joint piece 82, and, as shown in FIGS. 14A and 14B, comprises a slant connection face 84 which slants rearward, downward and outward, wall faces 85 which form both-side side faces, in a width direction, of the slant connection face 84, and connection pieces 86 which are provided to contact the outer face portion 92 of the tunnel side frame 9 and vertically connect the tunnel side frame joint piece 81 and the floor panel joint piece 82.

The connecting member 80 is configured such that the tunnel side frame joint piece 81 is joined to the bottom face portion 91 of the tunnel side frame 9 by welding or the like and the floor panel joint piece 82 is joined to the lower face of the floor panel 2 and a flange portion (upper face) of the tunnel side frame 9 by welding or the like.

According to this structure, since the connecting member 80 connects the lower face of the tunnel side frame 9 and the lower face of the floor panel 2 such that the floor panel joint piece 82 at least partially overlaps with the upper-floor inclination member 32 in the plan view, the load transmission performance of a portion where the tunnel side frame closed-cross section portion 9S and the upper-floor inclination member closed-cross section portion 32S are offset vertically in the front view can be improved.

Further, while the right-and-left floor front inclination members which are provided in front of the front tunnel member 20 of the floor panel 2 to extend obliquely rearward and inward from the connection portions CFr, CFl of the side sills 3 and the hinge pillars 4 are set to be the under-floor inclination members 31 provided below the floor panel 2 and also the right-and-left floor rear inclination members which are provided in back of the front tunnel member 20 of the floor panel 2 to extend obliquely forward and inward from the connection portions CRl, CRr of the side sills 3 and the center pillars 5 are set to be the upper-floor inclination members 32 provided above the floor panel 2 in the above-described embodiment, the preset invention is not to be limited to this structure, but can include any modification.

For example, both of the floor front inclination member and the floor rear inclination member may be provided above the floor panel 2 or below the floor panel 2.

Alternatively, contrary to the above-described embodiment, the floor front inclination member may be set to be an upper-floor inclination member 310 provided above the floor panel 2, and the floor rear inclination member may be set to be an under-floor inclination member 320 provided below the floor panel 2 as shown in FIG. 15.

This alternative structure can provide the load transmission between the hinge pillar 4 provided at the front end of the side sill 3 and the hinge pillar 4 provided at the opposite-side side sill 3 with the lightweight structure in the SOL or vehicle side collisions, similarly to the above-described embodiment.

Further, in this case in which the floor front inclination member is set to be the upper-floor inclination member 310 and the floor rear inclination member is set to be the under-floor inclination member 320, the connecting member which connects the lower face of the tunnel side frame 9 and the lower face of the floor panel 2 may be also configured to at least partially overlap with the upper-floor inclination member 310 (floor front inclination member) provided above the floor panel 2 in the plan view, which is not illustrated.

Moreover, in the case in which the floor front inclination member is set to be the upper-floor inclination member 310 and the floor rear inclination member is set to be the under-floor inclination member 320, the front tunnel member closed-cross section portion 20S and an upper-floor inclination member closed-cross section portion 310S which is formed by the upper-floor inclination member 310 (floor front inclination member) and the floor panel 2 may be configured to overlap with each other in the vehicle width direction in the front view, which is not illustrated.

In another embodiment, despite the above-described structure of the front tunnel member 20 in which the first face portion 261 is attached to the bottom face portion 91 of the tunnel side frame 9 and the third face portion 263 is attached to the floor tunnel 8, the front tunnel member 20 may be attached to the vehicle body by the fastening portion 25 (hereafter, referred to as "middle fastening portion 25s (25sf, 25sm, 25sr)") which fastens the second face portion 262 to the inner face portion 93 of the tunnel side frame 9 via the upper panel 24 with a bolt B and nut N as shown in FIG. 7B, for example.

According to this embodiment as well, the front tunnel member 20 can properly contact the inner face portion 93 of the tunnel side frame 9 when the collision load is inputted, so that the smooth load transmission at the lower portion of the floor tunnel 8 can be achieved.

It is also preferable in another embodiment that the front tunnel member 20 be attached to the vehicle body by the outside fastening portion 25u which fastens the first face portion 261 to the bottom face portion 91 of the tunnel side frame 9 with a bolt B and nut N as shown in FIG. 7C.

According to this embodiment, the above-described effect that the smooth load transmission at the lower portion of the floor tunnel 8 can be achieved can be enhanced further.

In this embodiment as well as the above-described embodiment (see FIG. 7A) in which the outside fastening portion 25u and the inside fastening portion 25n are arranged substantially at the same longitudinal position, it is preferable that the outside fastening portion 25u and the middle fastening portion 25s be arranged substantially at the same longitudinal position (see FIG. 7C).

According to this embodiment, since the attachment strength is increased, the load-transmission performance at the lower portion of the floor tunnel 8 can be improved, similarly to the above-described embodiment.

Moreover, the roughly X-shaped portion of the present invention is not to be limited to the X-shaped portion 21 of the above-described embodiment that is formed in the exactly (really) X shape in the plan view as shown in FIG. 9A, but a slightly-deformed X shape may be applied as the shape of this portion alternatively.

The roughly X-shaped portion of the present invention may be configured like a roughly X-shaped portion 21A shown in FIG. 9B in which an opening angle θr of a pair of ridgeline portions 22r, 22r provided at a rear portion which opens rearward is larger than an opening angle θf of a pair of ridgeline portions 22f, 22f provided at a front portion which opens forward, or like another roughly X-shaped portion, not illustrated, in which the opening angle θr of the pair of ridgeline portions 22r, 22r is smaller than the opening angle θf of the pair of ridgeline portions 22f, 22f conversely.

Further, the roughly X-shaped portion of the present invention may be configured like a roughly X-shaped portion 21B shown in FIG. 9C in which a straight-line portion 27W extending in the vehicle width direction is provided between a pair of ridgeline portions 22r, 22r which opens toward one side in the vehicle width direction and a pair of ridgeline portions 22l, 22l which opens toward the other side in the vehicle width direction to interconnect these pairs of ridgeline portions 22r, 22l.

Additionally, the roughly X-shaped portion of the present invention may be configured like a roughly X-shaped portion 21C shown in FIG. 9D in which a straight-line portion 27L extending in the vehicle longitudinal direction is provided between a pair of ridgeline portions 22r, 22r provided at a rear portion which opens rearward and a pair of ridgeline portions 22f, 22f provided at a front portion which opens forward to interconnect these pairs of ridgeline portions 22r, 22f.

Also, in the above-described embodiment, the lower portion of the front end of the side sill 3, the torque box 15, and the under-floor inclination member 31 are joined together in order from above at the front end of the side sill 3 as shown in FIGS. 10A and 10B (see the area Z3 in FIG. 10B). According to this structure, since the torque box 15 is directly joined to the lower portion of the front end of the side sill 3, the load-transmission effect can be more utilized in preference to the effect of increasing the rigidity of the vehicle body with the torque box 15.

Herein, the lower portion of the front end of the side sill 3, the under-floor inclination member 31, and the torque box 15 may be joined together in order from above at the front end of the side sill 3 as shown in FIGS. 16A and 16B alternatively (see an area Z4 in FIG. 16B).

According to this structure, since the under-floor inclination member 31 is directly joined to the lower portion of the front end of the side sill 3, the performance of the load transmission from the connection portions (CFr, CFl) of the side sill 3 and the hinge pillar 4 to the under-floor inclination member 31 can be improved.

And, since the torque box 15 is joined to the lower portion of the front end of the side sill 3 via the under-floor inclination member 31, the effect of increasing the rigidity of the vehicle body with the torque box 15 can be more utilized in preference to the load-transmission effect.

Thus, it can be determined how (i.e., in what order from above) the under-floor inclination member 31 and the torque box 15 are joined to the lower portion of the front end of the side sill 3, considering the balance of the effect of increasing the rigidity of the vehicle body having the torque box 15 and the load-transmission effect.

While the front side frame extension portion 11 is configured to extend obliquely rearward and inward from the rear portion of the front side frame 7 below the floor panel 2 and connects to the front portion of the tunnel side frame 9 as described above, as another embodiment, a front side frame extension portion 110 may be formed in a substantially straight shape such that a rear portion of the front side frame 7 and a front portion of the tunnel side frame 9 are connected to each other substantially straightly and also a front tunnel member 200 may be configured such that both end portions, in the vehicle width direction, thereof becomes wider toward its forward side as shown in FIG. 17. That is, the front side frame extension portion 110 which extends obliquely rearward and inward and an attachment portion (a first face portion 261) of the front tunnel member 200 to the tunnel side frame 9 are arranged on a roughly-identical straight line in the plan view (see the same figure).

This front tunnel member 200 comprises an X-shaped portion 210 which is configured such that an opening angle of a pair of ridgeline portions 22f, 22f provided at a front portion which opens forward is larger than an opening angle of a pair of ridgeline portions 22r, 22r provided at a rear portion which opens rearward (see the same figure).

Thus, the front tunnel member 200 is configured such that the attachment portion (the first face portion 261) to the tunnel side frame 9 and a ridgeline portion 220 which forms the X-shaped portion 210 can branch off at a properly-forward position, compared with the front tunnel member 20 of the above-described embodiment. Accordingly, the performance of disperse/transmission of the input load from the front side frame 7 can be improved.

Moreover, since the front side frame extension portion 110 and the attachment portion (the first face portion 261) of the front tunnel member 200 can be straightly continuous from each other, an input load Ff from the front side frame 7 can be efficiently transmitted rearward from the front side frame extension portion 110.

What is claimed is:
1. A lower vehicle-body structure of a vehicle, comprising:
right-and-left side sills extending in a vehicle longitudinal direction at both outward sides, in a vehicle width direction, of a vehicle body;
a floor panel connected to the right-and-left side sills;

a floor tunnel protruding upward at a central portion of the floor panel;

a pair of tunnel side frames extending in the vehicle longitudinal direction along both sides, in the vehicle width direction, of the floor tunnel; and a tunnel member connecting right-and-left lower portions of the floor tunnel, wherein said tunnel side frame includes a U-shaped portion having a U-shaped cross section which opens upward, the U-shaped portion comprising a bottom face portion, an outer face portion, and an inner face portion, said tunnel member comprises a first face portion which opposes said bottom face portion of the tunnel side frame, a second face portion which opposes said inner face portion of the tunnel side frame, and a third face portion which extends inward from an upper end of said second face portion, and said tunnel member is attached to the vehicle body by attaching said first face portion to said bottom face portion of the tunnel side frame and attaching said third face portion to said floor tunnel directly or via a bracket, respectively.

2. The lower vehicle-body structure of the vehicle of claim 1, wherein two portions of said attaching are provided substantially at the same position in the vehicle longitudinal direction.

3. A lower vehicle-body structure of a vehicle, comprising:

right-and-left side sills extending in a vehicle longitudinal direction at both outward sides, in a vehicle width direction, of a vehicle body;

a floor panel connected to the right-and-left side sills;

a floor tunnel protruding upward at a central portion of the floor panel;

a pair of tunnel side frames extending in the vehicle longitudinal direction along both sides, in the vehicle width direction, of the floor tunnel; and a tunnel member connecting right-and-left lower portions of the floor tunnel, wherein said tunnel side frame includes a U-shaped portion having a U-shaped cross section which opens upward, the U-shaped portion comprising a bottom face portion, an outer face portion, and an inner face portion, said tunnel member comprises a first face portion which faces to said bottom face portion of the tunnel side frame, a second face portion which faces to said inner face portion of the tunnel side frame, and a third face portion which extends inward from an upper end of said second face portion, and said tunnel member is attached to the vehicle body by attaching said second face portion to said inner face portion of the tunnel side frame directly or via a bracket.

4. The lower vehicle-body structure of the vehicle of claim 3, wherein said tunnel member is attached to the vehicle body by attaching said first face portion to said bottom face portion of the tunnel side frame directly or via a bracket.

5. The lower vehicle-body structure of the vehicle of claim 4, wherein two portions of said attaching are provided substantially at the same position in the vehicle longitudinal direction.

* * * * *